(12) United States Patent
Matsumoto et al.

(10) Patent No.: US 6,188,340 B1
(45) Date of Patent: Feb. 13, 2001

(54) SENSOR ADJUSTING CIRCUIT

(75) Inventors: Masahiro Matsumoto; Satoshi Shimada, both of Hitachi; Seikou Suzuki, Hitachiota; Akihiko Saito, Hitachi; Atsushi Miyazaki; Keiji Hanzawa, both of Mito, all of (JP)

(73) Assignees: Hitachi, Ltd., Tokyo; Hitachi Car Engineering Co., Ltd., Hitachinaka, both of (JP)

( * ) Notice: Under 35 U.S.C. 154(b), the term of this patent shall be extended for 0 days.

(21) Appl. No.: 09/167,984

(22) Filed: Oct. 8, 1998

(30) Foreign Application Priority Data

Aug. 10, 1997 (JP) .................................................. 9-275896
Mar. 7, 1998 (JP) .................................................. 10-189340

(51) Int. Cl.[7] ...................................................... H03M 1/00
(52) U.S. Cl. .............................................................. 341/110
(58) Field of Search .................................... 341/110, 144, 341/155

(56) References Cited

U.S. PATENT DOCUMENTS 5,101,205 * 3/1992 Yasuda ................................... 341/155
5,576,709 * 11/1996 Onaya et al. ........................... 341/110

FOREIGN PATENT DOCUMENTS 3-51714  6/1991  (JP) .
8-62010  8/1996  (JP) .

* cited by examiner

Primary Examiner—Trong Phan
(74) Attorney, Agent, or Firm—Evenson, McKeown, Edwards & Lenahan, P.L.L.C.

(57) ABSTRACT

A sensor adjusting circuit for adjusting a digital sensor, whose circuit scale is small and which can maintain high accuracy in a wide adjustment range is provided. A sensor adjusting circuit for adjusting an analog input signal inputted from a sensor and outputting it as another analog output signal in accordance with a physical quantity to be sensed, comprises: a first analog-to-digital converter having an analog integrator (2) for integrating the analog input signal, a comparator (3) for comparing an output of the analog integrator with a predetermined value, and a D/A converter (7) for outputting an output of the comparator as the input signal; and a second digital-to-analog converter (5) for converting the output of the comparator and outputting it as the analog output signal.

15 Claims, 14 Drawing Sheets

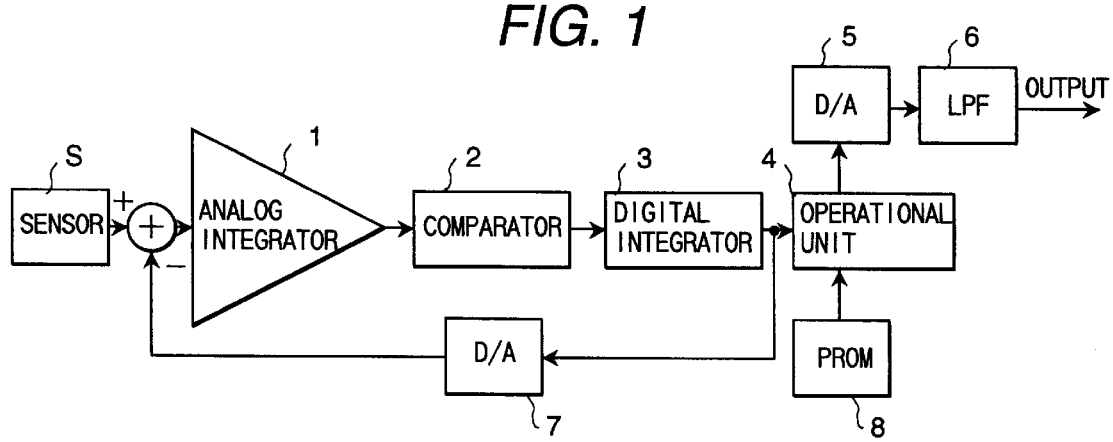
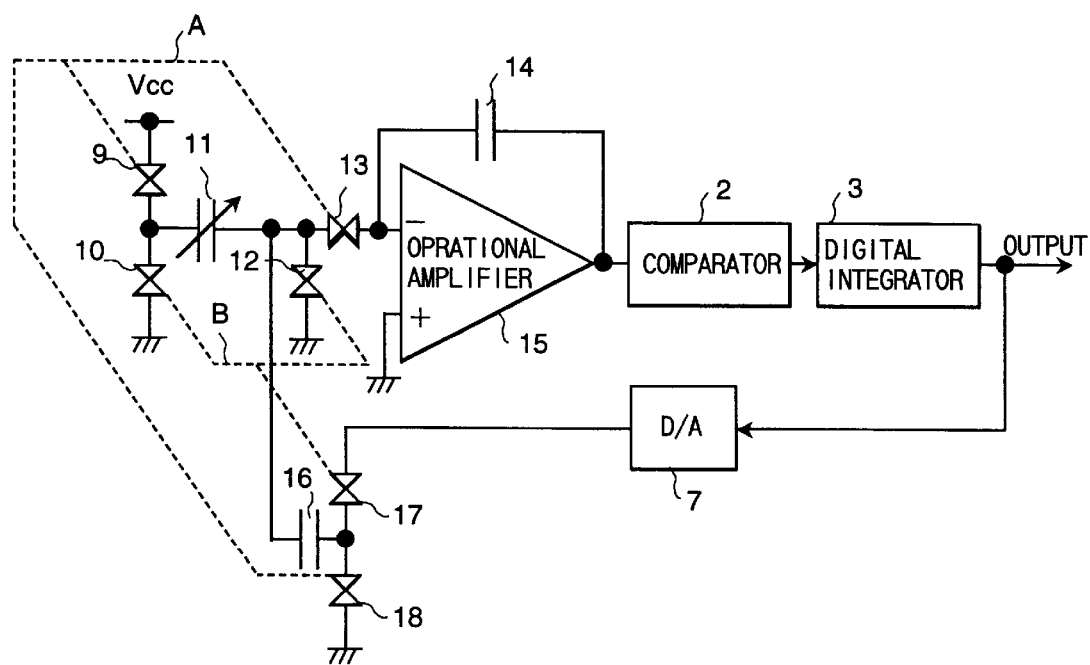

SENSOR ADJUSTING CIRCUIT

BACKGROUND OF THE INVENTION

The present invention relates to a circuit which is assembled in each of various sensors for sensing a physical quantity as an electric signal and processes the output signal and, more particularly, to a sensor adjusting circuit suitable for use in a capacitive acceleration sensor or a hot-wire air flow sensor.

In a sensor such as a capacitive acceleration sensor for sensing a physical quantity as an electric signal, it is necessary to adjust so that the scale of the physical quantity to be sensed and the scale of the output signal have a desired relation.

A process necessary for satisfying the desired relation is called scale adjustment (calibration) and a circuit assembled in a sensor for the process is a sensor adjusting circuit. Plainly speaking, the sensor adjusting circuit is nothing but a converting circuit for giving predetermined input/output characteristics.

The contents of the process carried out by the sensor adjusting circuit are generally span adjustment and offset adjustment. In this case, the span adjustment corresponds to sensitivity adjustment, and the offset adjustment corresponds to zero point adjustment.

A sensor adjusting circuit which uses a memory in which data necessary to be outputted is stored in a predetermined address and makes the address of the memory correspond to the level of an input signal, thereby outputting data to be read out as an output signal is conventional employed.

For example, Japanese Patent Application Laid-Open No. 3-51714 discloses a PROM (programmable read only memory) of a Zener zapping system and a method of selecting a leading part of a resistor array in accordance with the contents of data of the PROM, thereby adjusting a sensor output. There is disclosed another method of adjusting an sensor output by changing a circuit constant of a switched capacitor circuit on the basis of information written in the PROM.

On the other hand, for example, in Japanese Patent Application Laid-Open No. 8-62010, a method of adjusting a sensor output by using an A/D converter (analog-to-digital converter) and a CPU (central processing unit) is proposed.

As will be described hereinbelow, some of the conventional techniques do not consider limitation of expansion of the adjustment range and improvement in the accuracy. The other conventional technique does not consider that suppression of increase in the circuit scale is limited and has a problem with improvement of the cost performance.

With respect to the conventional techniques such as the method of selecting the leading part of the resistor array and the method of changing the circuit constant of the switched capacitor circuit, the circuit structure is easily formed on a chip. When expansion of the adjustment range and increase in accuracy are attempted, however, exponential increase in the circuit scale is accompanied so that the expansion of the adjustment range and the increase in accuracy are limited.

As for the conventional technique of the method using the A/D converter and the CPU, the expansion of the adjustment range and the increase in accuracy can be relatively easily realized. When general A/D converter and CPU are used, however, there is an overlapped function part (overhang). Consequently, an unused part in the circuit is large, the circuit scale is increased due to the unused part, and the suppression of increase in the circuit scale is therefore limited.

SUMMARY OF THE INVENTION

It is a first object of the invention to provide a sensor adjusting circuit which can easily obtain a wide adjustment range and high accuracy with a small circuit scale.

It is a second object of the invention to provide a signal generating circuit for sensor output adjustment which does not have a functional overhang part and has a sufficiently small circuit scale while maintaining the wide adjustment range and high accuracy.

The first object is achieved by a sensor adjusting circuit comprising an analog-to-digital converter, an operational unit for processing an output of the analog-to-digital converter by a prestored program, and a writable memory for holding data for adjustment, wherein the analog-to-digital converter is constructed by an oversampling analog-to-digital converter comprising an analog integrator, a comparing circuit, and a digital-to-analog converter.

By using the oversampling analog-to-digital converter, the number of bits of a digital signal necessary for holding the adjustment range and the accuracy can be reduced. Thus, the circuit scale can be suppressed to be small.

The second object is achieved by a digital sensor adjusting circuit for adjusting an output of a sensor which senses a physical quantity by processing the output of the sensor by using prestored data for characteristic adjustment, comprising: an analog integrator for integrating outputs of the sensor and outputting resultant data; a comparator for converting and outputting the output of the analog integrator into a digital signal of level 1 or level 0; a 1-bit D/A converter for converting the output of the comparator into an analog signal and outputting the analog signal; and a subtracter for subtracting the output of the 1-bit D/A converter from an input of the analog integrator, wherein the output of the comparator is processed with the prestored data for characteristic adjustment.

With the above construction, the output of the sensor for physical detection can be digitized without using a first stage amplification circuit and an A/D converter, so that the functional overhang can be eliminated.

BRIEF DESCRIPTION OF THE DRAWINGS

FIG. 1 is a block diagram showing an embodiment of a sensor adjusting circuit according to the invention;

FIG. 2 is a block diagram showing another embodiment of the sensor adjusting circuit according to the invention;

DETAILED DESCRIPTION OF THE PREFERRED EMBODIMENTS

Figure 3:
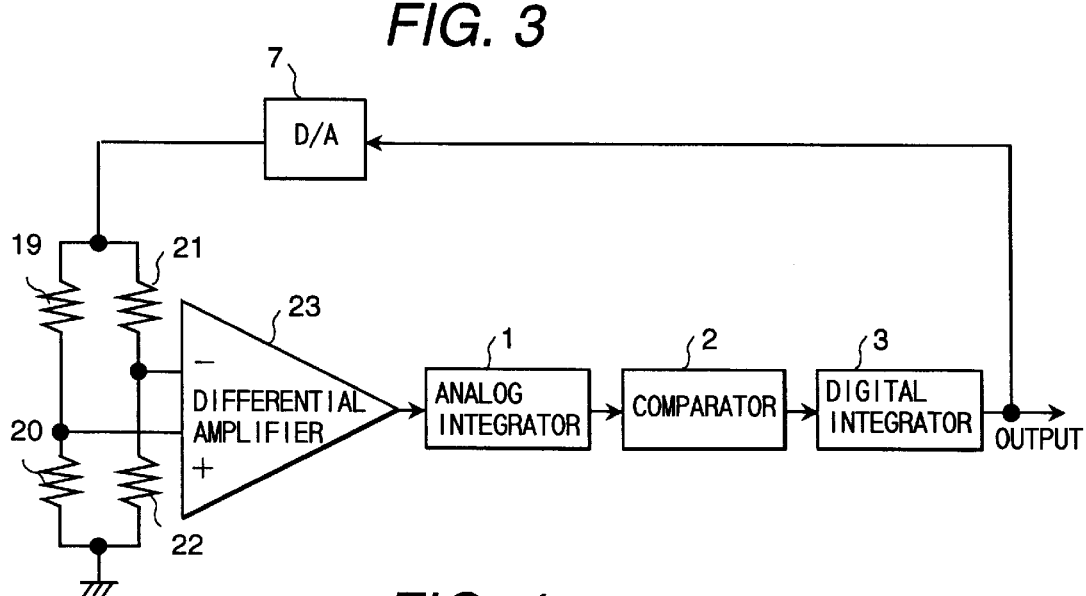
FIG. 3 is a block diagram showing further another embodiment of the sensor adjusting circuit according to the invention.

The sensor adjusting circuit according to the invention will be described in detail hereinbelow by embodiments shown in the drawings.

FIG. 1 shows a first embodiment of the invention, in which reference numeral 1 denotes an analog integrator; 2 a comparator; 3 a digital integrator; 4 an operational unit; 5 a D/A converter (digital-to-analog converter); 6 an LPF (low pass filter); 7 a D/A converter; and 8 a PROM.

The level adjusting circuit according to the invention is mainly divided into three kinds of functional parts. The functional parts are constructed as described hereinbelow in the first embodiment.

The first functional part is constructed by the analog integrator 1, the comparator 2, the digital integrator 3, and the D/A converter 7.

The difference between an input signal from a sensor S and an output of the D/A converter 7 is subjected to integration of the analog integrator 1.

The output of the analog integrator 1 is supplied to the comparator 2, where the output is compared with a predetermined voltage every predetermined cycle and converted into a signal of level 0 or 1.

Further, an output of the comparator 2 is supplied to the digital integrator 3 and is subjected to integration and a resultant signal is outputted as a time series digital signal of a predetermined number of bits.

The output of the digital integrator 3 is also supplied to the D/A converter 7 and is converted into an analog signal which is subtracted from the input signal.

By the above operation, the first functional part has the function of outputting the time series digital signal having the number of bits equal to that of the D/A converter 7 and whose average value changes according to the input signal from the digital integrator 3.

By setting the operation cycle (inverse number of the frequency) of the comparator 2 to a value as small as, for example, 1/10 or smaller of the operation cycle (a large value of ten times or larger in terms of frequency) determined from the response speed requested to the sensor as an object, the first functional part displays the function as a so-called oversampling A/D converter. As a result, even when the number of bits of the D/A converter 7 is set to the minimum of 1 bit, principally, the necessary adjustment range and accuracy can be assured.

This is because that the sensor adjusting circuit of the invention realizes necessary adjustment by an operation of the average value. Even if the number of bits of the D/A converter 7 is 1 bit, the average value of the output signal can be obtained. In this case, the digital integrator 3 is unnecessary and it is sufficient to supply the output of the comparator 2 as it is to the operational unit 4 and the D/A converter 7.

It cannot be said that the case of setting the number of bits of the D/A converter 7 to 1 bit is very practical since a problem as will be described hereinlater occurs. Nevertheless, according to the invention, the number of bits such as 4 to 12 bits which is much smaller than the number of bits estimated from the required accuracy can be set.

The second functional part is constructed by the operational unit 4 and the PROM 8.

The signal outputted from the digital integrator 3 and digital data read from the PROM 8 is calculated by the operational unit 4, thereby varying the average value of the output signals obtained from the first functional part.

By the operation, the second functional part has the function of substantially adjusting the zero point and the span of the output signal from the sensor.

In this case, since the number of bits of the signal outputted from the first functional part is set to a small number of bits as described above, the circuit scale of the operational unit 4 can be accordingly reduced.

Since the digital operational process is executed, unlike adjustment by an analog circuit device, there is not feared that an influence by a device variation and a change in temperature is exerted. Consequently, very accurate adjustment can be easily performed.

Lastly, the third functional part is constructed by the D/A converter 5 and the LPF 6.

The digital signal outputted from the operational unit 4 is converted into an analog signal by the D/A converter 5 and the analog signal outputted from the D/A converter 5 is smoothed by the LPF 6.

In this manner, the third functional part has the function of converting the digital signal obtained from the second functional part into the analog signal, averaging the analog signal, and outputting an adjusted sensor signal.

In this case as well, as described above, since the number of bits of the signal outputted from the first functional part is reduced, the circuit scale of the D/A converter 5 can be made small.

As mentioned above, the oversampling A/D converter comprising the analog integrator 1, the comparator 2, the digital integrator 3, and the D/A converter 7 is used in the embodiment. As a result, even if the number of bits of the digital signal is reduced, the necessary adjustment range and accuracy can be assured and the circuit scale is not enlarged.

Since the adjusting process is carried out by a digital signal, there is not feared that an influence by variation of the circuit device for adjustment and a change in temperature is exerted, so that high accuracy can be easily maintained.

The number of bits can be reduced to 1 bit as described above.

The number of bits has the trade-off relation with the number of input signals necessary for averaging in order to assure a desired accuracy. When the number of bits is reduced, the number of input signals for averaging has to be increased.

The time to obtain the average value is limited by the response speed of the sensor as an object. Consequently, with increase in the number of input signals, it is necessary to increase the operational speed of the sensor adjusting circuit itself. As a result, a heavy load is placed especially on the operational unit 4. Since high performance is required, the costs increase.

On the contrary, when the number of bits is set to as large as 16 bits, although the operational speed of the sensor adjusting circuit itself can be low, the digital integrator 3 and the operational unit 4 have to proceed a large number of bits and the circuit scale is therefore increased.

In consideration of the above, in the embodiment of the invention, it is decided that 4 to 8 bits is appropriate for the number of bits of the D/A converter 7.

When the number of bits is set to 4 to 8 bits, the operating speed of the sensor adjusting circuit itself is within a practical range and the circuit scale is also within a proper range.

The embodiment of the invention will be described more specifically.

According to the invention, the first functional part can be integrated into a sensor circuit of the sensor to be combined.

Such an embodiment will be described hereinbelow.

FIG. 2 illustrates an embodiment when a capacitive sensor is applied as a sensor to be combined.

The capacitive sensor denotes a sensor for sensing a physical quantity to be sensed as a change in capacitance. A capacitive acceleration sensor is typical.

In FIG. 2, reference numerals 9, 10, 12, 13, 17, and 18 denotes analog switches; 11 a sensor capacitor; 14 a capacitor for feedback; 15 an operational amplifier; and 16 a reference capacitor. Other elements are the same as those in FIG. 1.

Each of the analog switches is constructed by a known semiconductor switch or the like. The analog switches are divided into two groups A and B and controlled. The analog switches 9, 13, and 18 belong to group A and the analog switches 10, 12, and 17 belong to group B. When the group A is controlled to be on, the group B is controlled to be off. On the contrary, when the group A is turned off, the group B is turned on.

The sensor capacitor 11 is constructed so that its capacitance changes according to the physical quantity to be detected. In this case, if the sensor is the acceleration sensor, the capacitance of the sensor capacitor 11 changes according to the acceleration acting on the sensor.

The operational amplifier 15 operates as an integrator by having the capacitor 14 for feedback, thereby displays the same function as that of the analog integrator 1 in the embodiment of FIG. 1.

The reference capacitor 16 is charged with an output of the D/A converter 7 and feeds back the output of the D/A converter 7.

The operation of the embodiment of FIG. 2 will now be described. In the embodiment, by repeating first and second operations for turning on and off the analog switches of groups A and B alternately, the capacitance value of the sensor capacitor 11 is sensed.

The cycle for repeating the first and second operations can be set to the same as the operational cycle of the comparator 2 or shorter.

In the first operation, the analog switches 10, 12, and 17 of group B are turned on.

Then the sensor capacitor 11 is discharged by the analog switches 10 and 12 and the reference capacitance capacitor 16 is charged with the output of the D/A converter 7 via the analog switch 17.

In the second operation, the analog switches 9, 13, and 18 of group A are turned on.

The sensor capacitor 11 and the reference capacitor 16 are connected in series via the analog switches 9 and 18 between the power source voltage Vcc and the ground. The contact point between the sensor capacitor 11 and the reference capacitor 16 is connected via the analog switch 13 to an inversion input of the operational amplifier 15.

The sensor capacitor 11 is charged with the power source voltage Vcc and the reference capacitor 16 is discharged. The difference current between the charged current of the sensor capacitor 11 and the discharge current of the reference capacitor 16 is charged into the capacitor 14 for feedback via the analog switch 13. As a result, a voltage according to the terminal voltage of the capacitor 14 for feedback appears on the output of the operational amplifier 15.

The voltage appeared on the output of the operation amplifier 15 is supplied to the D/A converter 7 via the comparator 2 and the digital integrator 3 and serves as a value of the charge current to the reference capacitor 16 in the first operation of the next cycle.

Consequently, the average value as an output of the digital integrator 3 is obtained by the following equation (1).

$$D = \frac{CsVcc}{CrKda} \qquad \text{(equation 1)}$$

where,

D: average value of outputs of the digital integrator 3

Cs: capacitance value of the sensor capacitor 11

Vcc: power source voltage

Cr: capacitance value of the reference capacitor 16

Kda: conversion coefficient of the D/A converter 7

As obviously understood from (equation 1), as an output of the digital integrator 3 in FIG. 2, a digital signal indicative of the capacitance value of the sensor capacitor 11 is derived. According to the embodiment, it is therefore understood that the first functional part of the sensor adjusting circuit also serves as the sensor circuit of the capacitive sensor which should be assembled into the sensor adjusting circuit.

According to the embodiment of FIG. 2, therefore, the sensor adjusting circuit can have the function of the sensor circuit which should be assembled into the sensor adjusting circuit. As a result, the wide adjusting range and the high accuracy can be assured and the circuit scale as a whole including the sensor circuit can be sufficiently reduced.

According to the embodiment, a detection error can be also reduced.

When the sensor adjusting circuit and the first functional part are separately provided, errors of the respective circuits are added. In the embodiment of FIG. 2, however, the sensor circuit of the sensor is assembled into the first functional part, so that the error can be reduced by the feedback effect.

FIG. 3 shows an embodiment when a hot wire type air flow meter used for controlling an engine of a vehicle or the like is employed as the sensor to be assembled. In FIG. 3, reference numerals 19 to 22 denote hot wire resistors and 23 indicates a differential amplifier. The other component elements are the same as those of the embodiment of FIG. 1.

The four hot wire resistors 19 to 22 construct a bridge circuit. A voltage when the bridge circuit becomes unbalance by an air flow is detected by the differential amplifier 23 and is outputted as a detection signal of the air flow rate. In this case, by using the output of the D/A converter 7 as a current source of the bridge circuit consisting of the hot wire resistors 19 to 22, both of the sensor circuit of the hot wire type air flow meter and the first functional part of the sensor adjusting circuit are constructed.

Consequently, in the embodiment of FIG. 3 as well, the sensor adjusting circuit can have the function of the sensor circuit which should be assembled to the sensor adjusting circuit. As a result, the wide adjustment range and the high accuracy can be assured. The circuit scale as a whole including the sensor circuit can be sufficiently reduced and, further, errors can be reduced.

Figure 4:
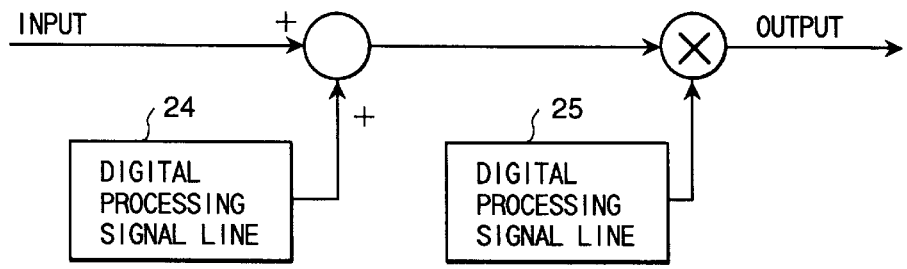
FIG. 4 is a block diagram illustrating the operation of an operational unit in the embodiment of the invention.

The operation of the operational unit 4 in the embodiment will be described with reference to the operational block diagram of FIG. 4.

As mentioned above, the operational unit 4 is a circuit for adjusting the zero point and the span of an output of the sensor as an object by executing addition and multiplication using a predetermined value to the average value of input signals (time series digital signals as outputs of the digital integrator 3).

The adding operation for adjusting the zero point is executed as follows. A digital processing signal line 24 which has been preliminarily written in the PROM 8 and has the same bit number as that of the D/A converter 7 and whose average value is an adjustment value as an object is read out and is added to the input signal. By simple performing the addition, the addition to the average value of the input signals can be carried out without changing the number of bits.

If an overflow occurs, however, a process for correcting it is necessary.

Figure 5:
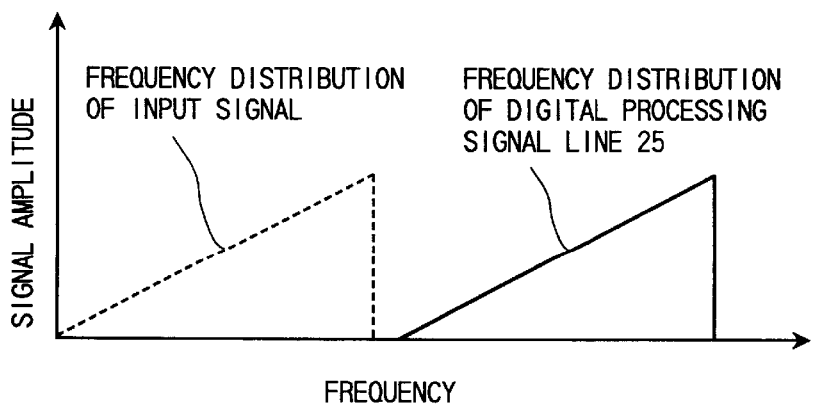
FIG. 5 is a diagram showing the frequency characteristics of a signal in the embodiment of the invention.

The multiplying operation for span adjustment is executed by reading out a digital processing signal line 25 and multiplying the input signal by the line 25. The digital processing signal line 25 is similarly preliminarily written in the PROM 8 and has the same number of bits as that of the D/A converter 7. The average value of the digital processing signal line 25 is an adjustment value as an object. The frequency characteristic of the digital processing signal line 25 is set so as not to be overlapped with a frequency distribution of the input signal as shown in FIG. 5. In this case as well, it is sufficient to execute the simple multiplication.

Although the number of bits is doubled by the multiplication in this case, since only the initial bits are effective, by cutting off the bits of the lower half, the same number of bits as that of the input signal can be maintained.

The reason why the frequency distributions are arranged so as not to be overlapped as shown in FIG. 5 is as follows.

When it is assumed that the frequencies of the input signal and the digital processing signal line 25 are overlapped, a signal in the overlapped frequency band is converted to a direct current signal by the multiplying operation and there is the possibility that the average value goes wrong.

An embodiment in which the digital integrator 3 and the operational unit 4 are constructed by an MPU (microprocessing unit) will be described with reference to FIG. 6.

Figure 6:
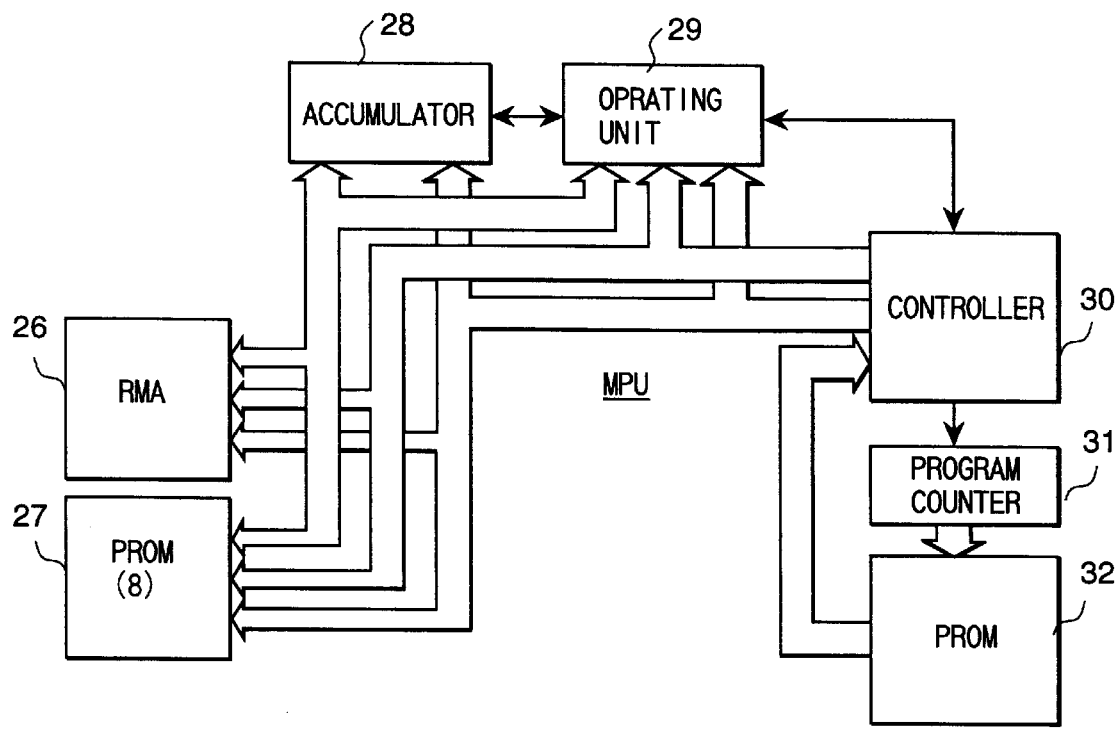
FIG. 6 is a block diagram showing an embodiment when a digital integrator and an operational unit are constructed by an MPU in the invention.

The MPU shown in FIG. 6 comprises a RAM 26 for temporarily storing data, a PROM 27 (corresponding to the PROM 8) for storing adjustment data, an accumulator 28, an operational unit 29 for executing arithmetic operation, a controller 30, a program counter 31, and a ROM 32 for storing programs. The operational unit 29, the program counter 31, and a data bus are controlled by the controller 30 in accordance with a program written in the RAM 32 and processes necessary for the operations as the digital integrator 3 and the operational unit 4 are executed.

In the embodiment, the ROM 32 for storing programs is directly accessed by an output of the program counter 31 and output data of the ROM 32 is directly outputted to the controller 30.

The instruction system in this case is one word per instruction. A backward branch instruction cannot be accepted and the maximum counting value of the program counter 31 and the number of words of the ROM 32 for storing programs are equal.

Consequently, in the embodiment, the program correctly operates without performing a reset, so that a reset upon the turn-on of the power source, that is, a power-on reset process is made unnecessary.

If a reset is not executed upon turn-on of the power source, the counting value of the program counter 31 becomes unstable and the program does not know from which address to start. Since there is no backward branch instruction in the program in the embodiment, when the program is started, the counting value of the program counter 31 is always increased. When the counting value reaches the maximum, it returns to zero.

As a result, it is guaranteed that the program operates by always passing the 0 address and, therefore, the reset process is not necessary.

In the embodiment, as a matter of course, the program is limited to a so-called cyclic program in which the address is cycled from 0 to the maximum counting value of the program counter 31.

As the program is used only for realizing the operations of the digital integrator 3 and the operational unit 4 in the embodiment, the fact that only the cyclic program can be used is not a limitation.

On the contrary, it also denotes that the program is not much affected by a runaway of the MPU. Even if the MPU runs away, the destination address of the runaway is always an address of the program and the program is a cyclic program, so that the operation is returned to the normal process eventually.

As it is known, it is typical that a general MPU is provided with monitoring means such as a watch dog timer in order to certainly assure the reset operation and deal with the runaway.

In the embodiment, however, the resetting process is unnecessary and no problem occurs at the time of runaway of the MPU. Consequently, the monitoring means is made unnecessary. The circuit scale can be reduced and the reliability of the MPU can be improved more.

An embodiment of the PROM 8 will be described with reference to FIG. 7.

Figure 7:
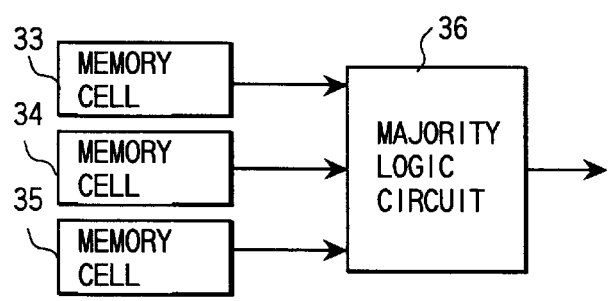
FIG. 7 is a block diagram showing an embodiment of a PROM in the invention.

FIG. 7 shows the construction of a memory cell which is a unit of the PROM 8. In the embodiment, the unit memory cell is constructed by three PROM memory cells 33, 34, and 35 and data read from them is outputted via a majority logic circuit 36.

Generally, the PROM is easily influenced by temperature and the reliability deteriorates at high temperature.

Especially, in case of a sensor for use in an engine room of a vehicle, space, and the like, it is used at high temperature, so that the reliability easily deteriorates.

In the embodiment of FIG. 7, therefore, data from a plurality of memory cells is used and the majority logic is obtained, thereby realizing an error correction logic and an error detection logic. Thus, erroneous data is eliminated and high reliability is maintained.

Other embodiments of the invention will now be described.

Figure 8:
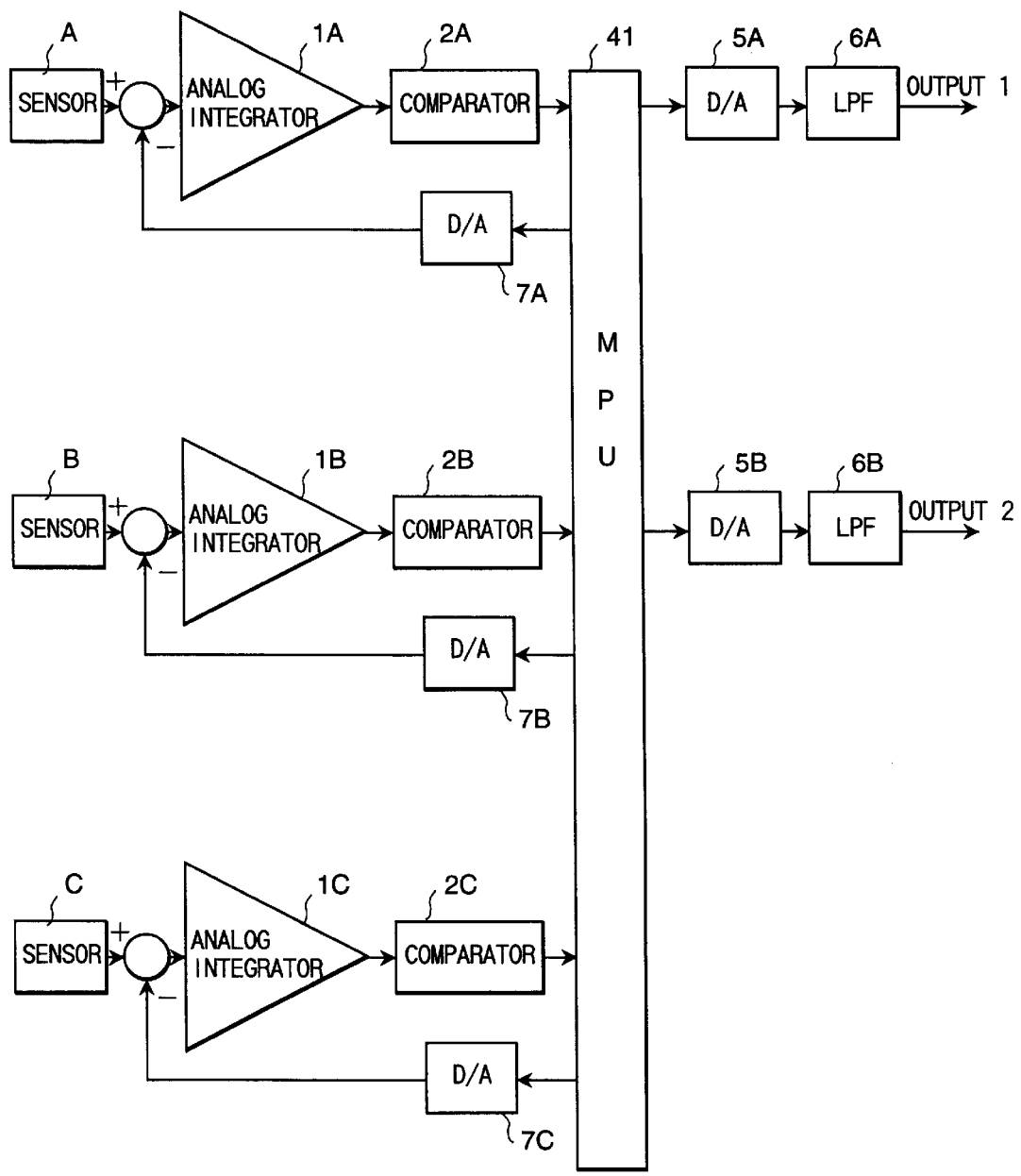
FIG. 8 is a block diagram showing another embodiment of the sensor adjusting circuit according to the invention.

FIG. 8 shows an embodiment of the invention. As shown in the diagram, a single MPU 41 is provided commonly for a plurality of sensors, for example, three sensors A, B, and C and functions as the digital integrator and the operational unit for the sensors by a time division process.

1A, 1B, and 1C are analog integrators each of which is the same as the analog integrator 1 in the embodiment of FIG. 1. Similarly, each of 2A, 2B, and 2C corresponds to the comparator 2, each of 5A and 5B corresponds to the D/A converter 5, each of 6A and 6B corresponds to the LPF 6, and each of 7A, 7B, and 7C corresponds to the D/A converter 7.

The MPU 41 is the one described in FIG. 6. As mentioned above, outputs of the sensors A, B, and C are sequentially time division processed in a predetermined order. Like the digital integrator 3 and the operational unit 4 in the embodiment of FIG. 1, the MPU 41 operates so as to adjust the zero point and the span of each sensor.

The embodiment of FIG. 8 has therefore an advantage that the circuit scale can be reduced more than the case where the digital integrators 3 and the operational units 4 are provided for the plurality of sensors, respectively.

Since the outputs from the plurality of sensors can be associated with each other and processed, there is an advantage that the an output of a sensor is compensated by an output of another sensor and the embodiment can easily deal with cases where the ratio or difference of outputs of the plurality of sensors is necessary.

According to the embodiment of the invention as mentioned above, by using the oversampling analog-to-digital converter, the number of bits of a digital signal necessary to assure the adjustment range and the accuracy can be reduced. As a result, while maintaining the necessary accuracy and adjustment range, the circuit scale can be sufficiently reduced.

The sensor adjusting circuit according to another embodiment of the invention will be described in details by the modes shown in diagrams.

Figure 9:
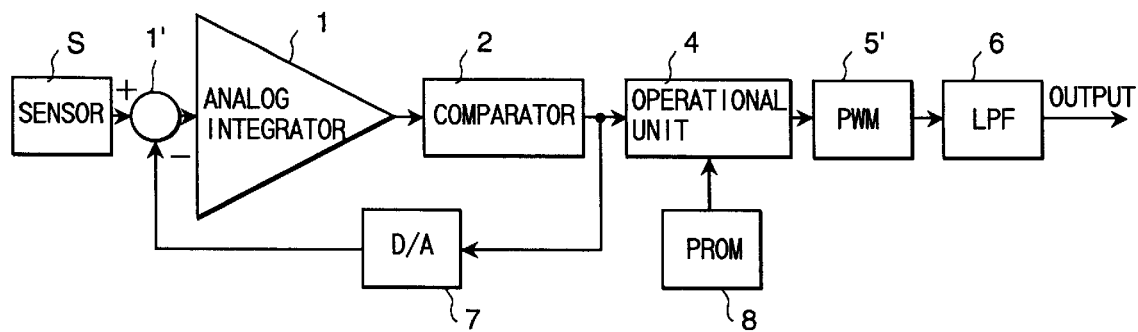
FIG. 9 is a block constructional diagram showing an embodiment of the sensor adjusting circuit according to the invention.

FIG. 9 shows a first embodiment of the sensor adjusting circuit of the invention. The sensor adjusting circuit of the embodiment is constructed mainly by parts of the following three kinds of functions.

The first part is a part having both of the functions of a first stage amplifier and an A/D converter and comprises a subtracter 1', the analog integrator 1, the comparator 2, and the 1-bit D/A converter 7.

The subtracter 1' has the function of subtracting an output of the 1-bit D/A converter 7 from a detection signal of a sensor (physical quantity sensing device) S.

The analog integrator 1 has the function of receiving and integrating the difference between an output signal of the sensor S and the output of the 1-bit D/A converter 7 from the subtracter 1'.

The comparator 2 has the function of comparing an output voltage of the analog integrator 1 with a predetermined reference voltage and converting to a 1-bit signal of level 1 or 0.

The 1-bit D/A converter 7 has the function of converting the output of the comparator 2 into an analog voltage and supplies the analog voltage to a negative (−) input terminal of the subtracter 1'.

As a result, an output signal (A) whose pulse density changes according to the signal sensed by the sensor S is obtained from the comparator 2.

A circuit for generating an output signal whose pulse density changes according to an input signal is called a $\Delta\Sigma$ modulator. In the invention, the signal supplied from the sensor S is modulated by using the modulator, thereby enabling the number of bits of the output of the sensor to be reduced.

The second part is a part having the function of adjusting the span and the zero point and is constructed by the operational unit 4 which is operated by an internal program and the PROM 8 in which predetermined data has been preliminarily written.

The operational unit 4 calculates the average value of the pulse density modulated output signals (A) obtained by the first functional part and executes an arithmetic operation to the average value of the output signals and the data stored in the PROM 8, thereby adjusting the span and the zero point of the output signal of the sensor S.

As mentioned above, since the output of the sensor S is processed by the digital arithmetic operation, unlike the adjustment by the analog device, the influence by the variation in devices and the change in temperature is not exerted. Consequently, the adjustment with extremely high accuracy can be realized.

Since the signal supplied from the sensor S is modulated and the number of bits is reduced, the circuit scale of this part is reduced.

The operation for obtaining the average value of the modulated signal (decimation operation) is also executed by the internal program of the MPU 4, so that the circuit scale can be also reduced from this point.

The third part is a part having the D/A converting function and is constructed by a PWM (pulse width modulator) 5' and the LPF (low pass filter) 6.

The PWM 5' outputs a signal whose pulse width is modulated according to the digital signal outputted from the operational unit 4, that is, a pulse width modulation signal. The LPF 6 averages the pulse width modulation signals outputted from the PWM 5' and generates analog signals.

Consequently, the D/A converting function is obtained by the PWM 5' and the LPF 6 and an output signal is derived with high accuracy by performing the span and zero point adjustment to the output signal from the sensor S.

A specific example of the first part in the foregoing embodiment of the invention will be described with reference to FIGS. 10 and 11.

Figure 10:
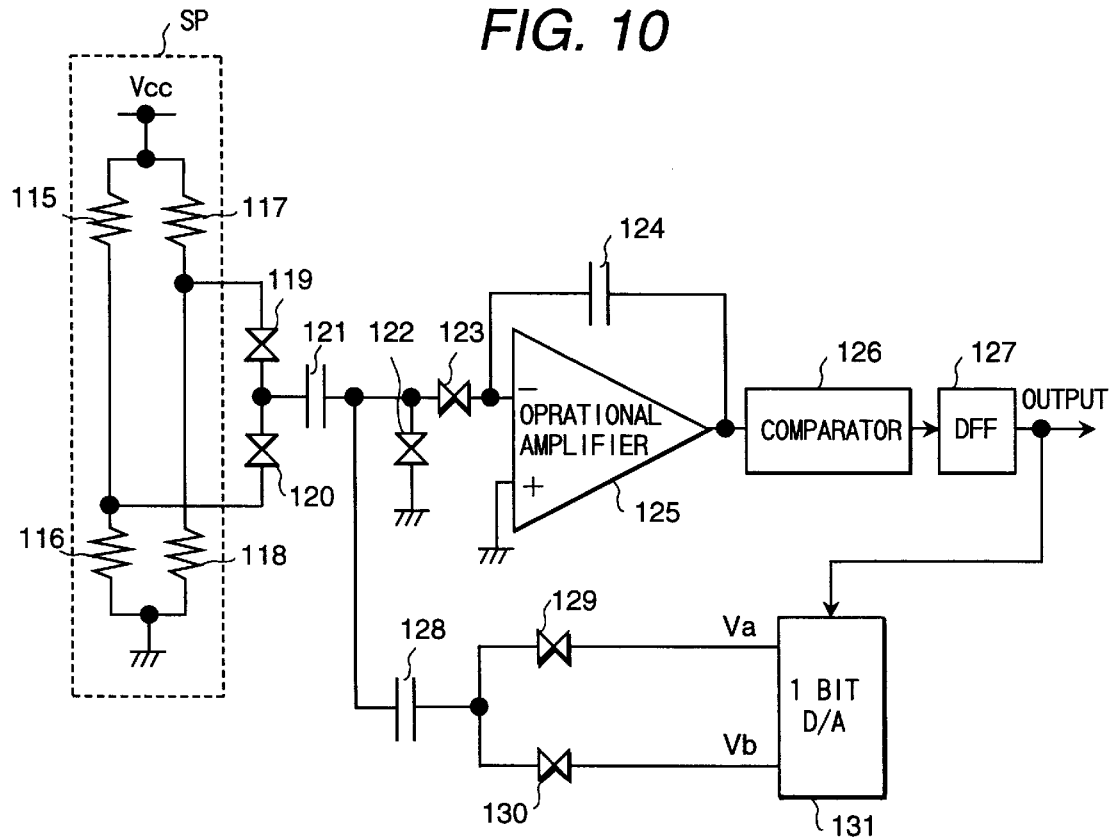
FIG. 10 is a circuit diagram of a detection part according to an embodiment of the invention using a piezoresistance type pressure sensor.

FIG. 10 shows an embodiment in which the invention is applied to a pressure measuring apparatus using a piezoresistive pressure sensor SP as a physical quantity sensing device. FIG. 11 shows an embodiment in which the invention is applied to an air flow rate measuring apparatus using a heat resistive air flow rate sensor SF as a physical quantity sensing device.

The embodiment of FIG. 10 will be described first. The pressure sensor SP comprises a bridge circuit constructed by four resistors 115, 116, 117, and 118 which are piezoresistive devices. The balance state of the bridge circuit changes according to a pressure acting on a pressure receiving part of the sensor, thereby obtaining an output voltage indicative of the pressure.

The operation of the embodiment will be explained. The circuit comprises six analog switches 119, 120, 122, 123, 129, and 130. By repeating two kinds of first and second operations, the switches are opened and closed. In the first operation, the analog switches 120, 122, and 129 are closed and the analog switches 119, 121, and 130 are opened.

By the operation, a capacitor (capacitive device) 121 is charged up with a voltage appearing between the resistors 115 and 116 in the pressure sensor SP and a capacitor 128 is charged up with an output voltage Va of a 1-bit D/A converter 131.

In the second operation, the analog switches 120, 122, and 129 are opened and the analog switches 119, 121, and 130 are closed.

By the operation, the capacitor 21 is charged up with a voltage across the resistors 17 and 18 and the voltage of the capacitor 121 is switched from the voltage across the resistors 115 and 116 to the voltage across the resistors 117 and 118.

The charge amount according to the change in voltage across both terminals of the capacitor 121 and the capacitance value of the capacitor 121 is supplied to an operational amplifier 125 via an analog switch 123 and an integrator constructed by the operational amplifier 125 and a capacitor 124 is charged with the charge amount.

The capacitor 128 is charged with an output voltage Vb of the 1-bit D/A converter 131, so that a voltage across the terminals of the capacitor 128 is switched from the voltage Va to the voltage Vb.

A charge amount according to the change in the voltage across the terminals of the capacitor 128 and the capacitance value of the capacitor 128 is inputted via the analog switch 123 to the operational amplifier 125 and the integrator constructed by the operational amplifier 125 and the capacitor 124 is charged up.

The integrator constructed by the operational amplifier 125 and the capacitor 124 is therefore charged with charges according to the voltage of the bridge circuit of the pressure sensor SP and the difference between the output voltages Va and Vb of the 1-bit D/A converter 131. The result is reflected in the output of the integrator constructed by the operational amplifier 125 and the capacitor 124.

The output is supplied to a comparator 126 and is binarized. The binarized data is held by a DFF (D flip flop) 127 so that the result can be reflected upon the next charging operation.

An output of the DFF 127 is inputted to the 1-bit D/A converter 131, so that the outputs Va and Vb are changed accordingly.

For example, when the output of the DFF 127 is 1, the output Va of the 1-bit D/A converter 131 becomes a reference voltage V1 and the output Vb becomes a reference voltage V2. When the output of the DFF 127 is 0, the output Va becomes the reference voltage V2 and the output Vb becomes the reference voltage V1.

By repeating the first and second operations, the average value of the output voltages of the integrator constructed by the operational amplifier 125 and the capacitor 124 is converged on 0. As a result, the average value of the voltages of the outputs Va and Vb of the 1-bit D/A converter 131 coincides with the output voltage of the pressure sensor SP.

When the average value of the voltages between the outputs Va and Vb is set to be proportional to the average value of outputs of the DFF 127, by digitally obtaining the average value of the outputs of the DFF 127, the output voltage of the pressure sensor SP can be derived.

The degree of change in the average value of the output voltages of the DFF 127 is determined how the voltages at the outputs Va and Vb of the 1-bit D/A converter 131 are changed, namely, how each of the reference voltages V1 and V2 and the difference of the voltages are decided.

If the change amount of the outputs Va and Vb of the 1-bit D/A converter 131 with respect to the output of the DFF 127 is reduced, the change ratio of the average value of the output of the DFF 127 with respect to the change in the bridge voltage of the pressure sensor SP can be increased.

Since the outputs of the DFF 127 have levels of "1" and "0" only, the range of the average value L is 0>L<1.

If the sensitivity to the bridge voltage of the pressure sensor SP is increased, the measurement range is narrowed. Contrarily, when the change amount of the outputs Va and Vb of the 1-bit D/A converter 131 is increased, although the change ratio of the average value of the outputs of the DFF 127 with respect to the change in the bridge voltage of the pressure sensor SP is reduced, the measurement range is widened.

In other words, the optimum change voltage can be applied to the outputs Va and Vb of the 1-bit D/A converter 131 in accordance with the maximum change amount of the bridge voltage of the pressure sensor SP, so that the measurement range which cannot be changed and expanded by a general A/D converter can be easily changed and expanded.

The input range of a general A/D converter usually corresponds to the power source voltage. On the contrary, the change in the bridge voltage of the pressure sensor SP is tens mV. When a general A/D converter is used, an amplification circuit is therefore necessary at the first stage as mentioned above.

In the embodiment, however, by applying a predetermined change voltage to the outputs Va and Vb of the 1-bit D/A converter 131, the voltage level can be easily adjusted. Consequently, a preamplifier is made unnecessary.

Since the input impedance of the circuit is determined by the capacitor 121 in the embodiment, a relatively high input impedance can be easily obtained. Consequently, from the viewpoint of the impedance conversion as well, the amplification circuit at the first stage can be made unnecessary.

According to the embodiment, the outputs Va and Vb of the 1-bit D/A converter 131 can also have a temperature characteristic. Temperature compensation can be therefore carried out in such a manner that the temperature characteristic opposite to that of the pressure sensor SP or that of the circuit is added to the output characteristics of the 1-bit D/A converter 131 to thereby offset the temperature characteristic of the pressure sensor SP or the temperature characteristic of the circuit.

An embodiment of FIG. 11 will now be described.

Figure 11:
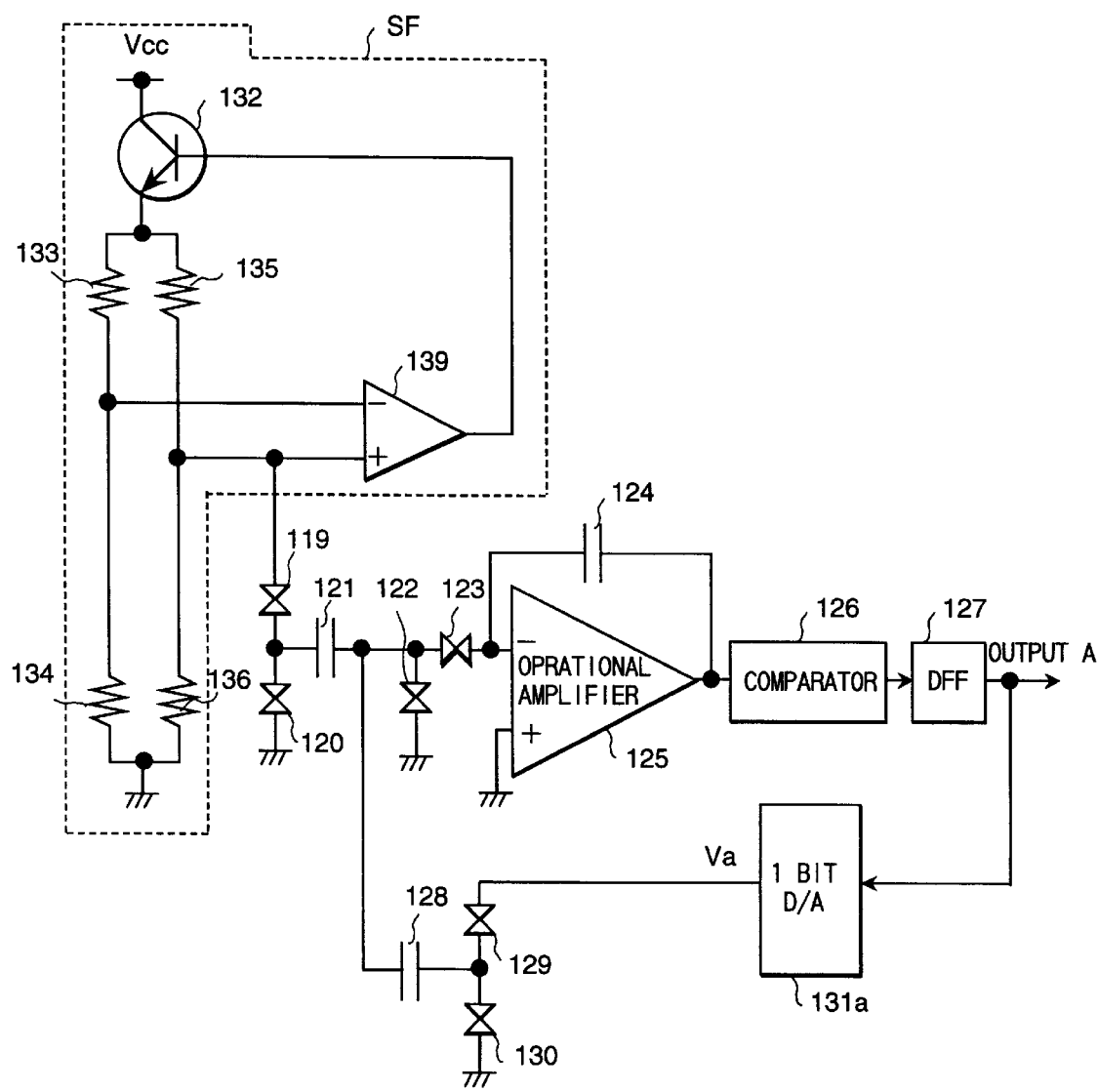
FIG. 11 is a circuit diagram of a detection part according to an embodiment of the invention using a heat resistive type air flow rate sensor.

The embodiment of FIG. 11 is different from FIG. 10 with respect to the points such that the air flow rate sensor SF is used in place of the pressure sensor SP in the embodiment of FIG. 10 and a 1-bit D/A converter 131a is employed instead of the 1-bit D/A converter 131. The other construction and operation are the same, so that their description is omitted here. Only the different points will be described hereinbelow.

The heat resistive air flow rate sensor SF senses the air flow rate by measuring a radiation amount generated by the air flowing on the surface of a hot wire resistive element 135, thereby measuring the air flow rate. In practice, a current is flowed to the hot wire resistive element 135, the hot wire resistive element 135 is heated by Joule heat generated by the current and is controlled so that the temperature becomes constant, a radiation amount generated by the flow of air and the heating amount by the Joule heat generated by the current are balanced and the value of the current required for the heating is measured, thereby measuring the air flow rate.

For this purpose, the air flow rate sensor SF comprises: a transistor 132 for controlling the current supplied to the hot wire resistive element 135; resistive elements 133, 134, and 136 for forming the bridge circuit together with the hot wire resistive element 135; and a differential amplification circuit 139 for detecting the bridge voltage of the bridge circuit and controlling the transistor 132.

Like the hot wire resistive element 135, the resistive element 133 is arranged in a passage of air to be measured, detects the air temperature by using the fact that a value of resistance changes according to the temperature of air, and is subjected to temperature compensation. The sensor output is generated as a signal between the connection point of the hot wire resistive element 135 and the resistive element 136 and the ground (common potential).

The 1-bit D/A converter 131a is basically the same as the 1-bit D/A converter 131 in the embodiment of FIG. 10. In the case of FIG. 11, the output of the air flow rate sensor SF is generated as a signal which uses one of the levels as a common potential.

The 1-bit D/A converter 131a in the embodiment of FIG. 11 generates the output Va of a predetermined voltage value when the output of the DFF 127 is at the level 1 but does not generate a signal when the output of the DFF 127 is at the level 0.

Accordingly, one end of each of the analog switches 120 and 130 is connected to the ground and an earth potential is received as an output Vb.

In the embodiment of FIG. 11 as well, by applying a proper change voltage to the 1-bit D/A converter 131a and generating the output Va of a predetermined voltage to the earth voltage (0 voltage), thereby enabling the amplification circuit at the first stage to be eliminated. The other advantages as those of the embodiment of FIG. 10 can be also obtained.

Referring again to FIG. 9, the second part will be described.

Figure 12:
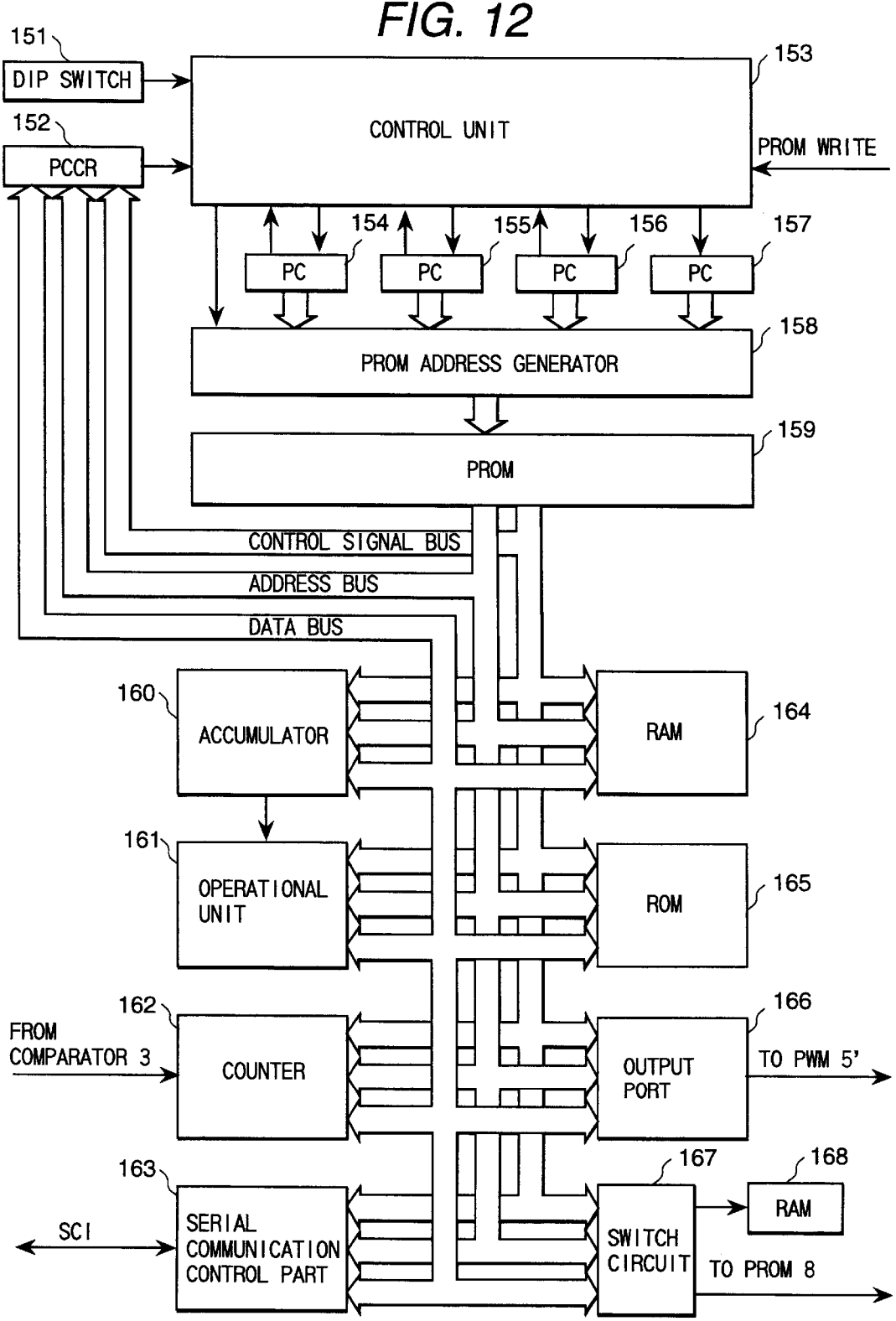
FIG. 12 is a block diagram showing the construction of an operational unit according to the embodiment of the invention.

The operational unit 4 in the second part has the construction as shown in FIG. 12 and executes four kinds of tasks time divisionally as described hereinbelow.

The first task is the task for decimation and interpolation. The decimation is a process for calculating the average value of the output signals of the comparator 2. The interpolation is a process for modulating a signal outputted from a sensor such as the pressure sensor SP or the air flow rate sensor SF to reduce the number of bits. The first task is executed with the highest priority.

The second task is the task for reading the contents written in the PROM 8, executing an arithmetic operation to the information and the average value of the output signals of the comparator 2 obtained by the first task, and adjusting the span and the zero point of the signal outputted from the sensor.

The third task is a subroutine process of the second task and the task for executing multiplication.

The fourth task is the task for executing a process which is activated when an external signal PROM_WRITE becomes at the low level, receives information from an SCI (serial communication interface), and writes the information to the PROM 8.

The execution of the tasks is controlled by a dip switch 151, a PCCR (program counter control register) 152, PCs (program counters) 154, 155, 156, and 157, a control unit 153, and a program storing ROM address generator 158.

A control signal of the internal bus and a signal of an address bus are generated by a program storing ROM 159. According to the contents of the control signal and the address bus signal, data is transferred among an accumulator 160, an operational unit 161, a counter 162, a serial communication control part 163, a RAM (random access memory) 164, a ROM (read only memory) 165, an output port 166, a switch circuit 167, and the PCCR (program counter control register) 152 which are connected to the internal buses (the control signal bus, address bus, and data bus). The switch circuit 167 switches a RAM 168 and the PROM 8 (FIG. 16) which are connected to the circuit 167 and a buffer operation.

The operation of the operational unit 4 will now be described.

The operation of the control unit 153 will be explained first. As a first operation, the control unit 153 controls the PCs 154, 155, 156, and 157. As a second operation, the control unit 153 generates task execution signals to control the execution of the four kinds of tasks.

The first operation of the control unit 153, that is, the operation for controlling the PCs 154, 155, 156, and 157 will be described.

The control unit 153 generates signals for controlling stopping and executing a counting operation to the PCs 154, 155, 156, and 157 by a logic shown in FIG. 6.

Figure 13A:
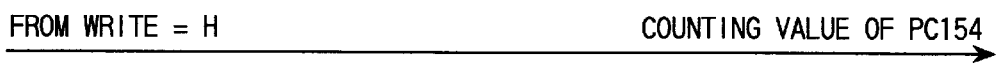
FIGS. 13a–13d are a diagram for explaining counting conditions in the operational unit in the embodiment of the invention.

For the PC 154, as shown in FIG. 13A, a signal for counting up the counter 154 when an external signal PROM_WRITE is at the high level is generated.

Figure 13B:
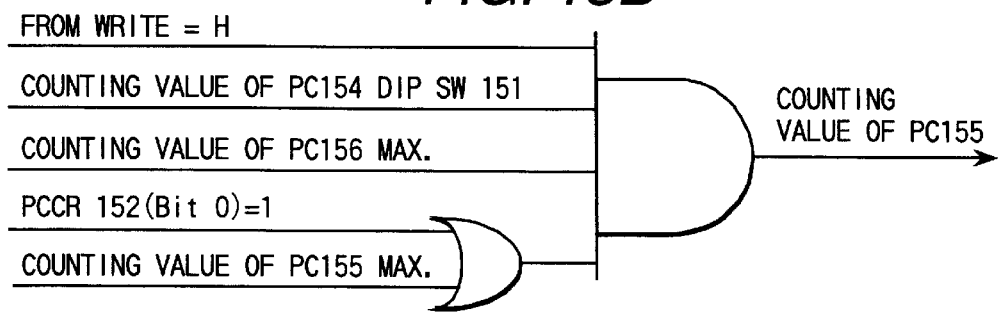

As shown in FIG. 13B, the PC 155 is counted up when the external signal PROM_WRITE is at the high level, the counting value of the PC 154 is larger than a preset value of the dip switch 151, the counting value of the PC 156 is the maximum value, and the bit 0 of the PCCR 152 is "1" or the counting value of the PC 155 is not the maximum value.

Figure 13C:
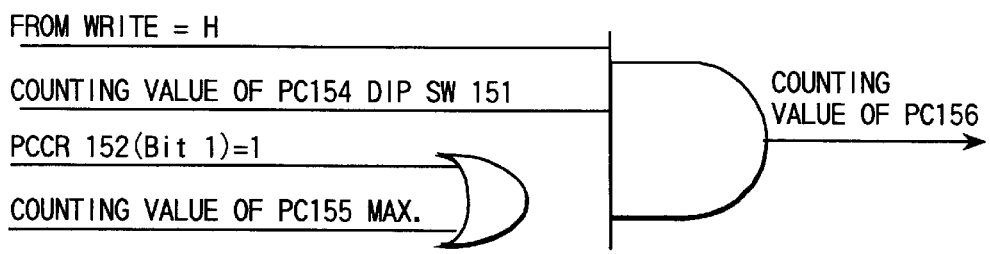

As shown in FIG. 13C, the PC 156 is counted up when the external signal PROM_WRITE is at the high level, the counting value of the PC 154 is larger than the preset value of the dip switch 151, and the bit 1 of the PCCR 152 is "1" or the counting value of the PC 156 is not the maximum value.

Figure 13D:

As shown in FIG. 13D, the PC 157 is counted up when the external signal PROM_WRITE is at the low level.

The second operation of the control unit 153, that is, the generation of the task execution signals will be described. The control unit 153 generates execution signals for four tasks by the logic as shown in FIG. 14.

Figure 14A:
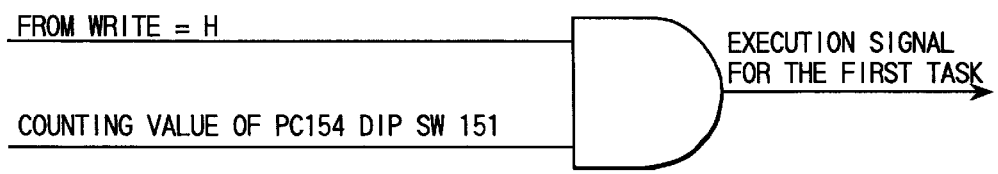
FIGS. 14a–14d are a diagram for explaining execution task switching control conditions in the operational unit according to the embodiment of the invention.

As shown in FIG. 14A, the execution signal for the first task is generated when the external signal PROM_WRITE is at the high level and the counting value of the PC 154 is equal to or smaller than the set value of the dip switch 151.

Figure 14B:
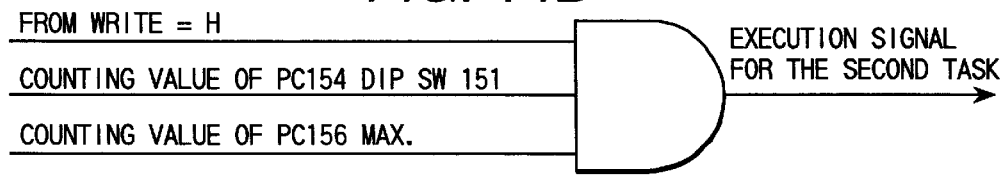

As shown in FIG. 14B, the execution signal for the second task is generated when the external signal PROM_WRITE is at the high level, the counting value of the PC 154 is larger than the preset value of the dip switch 151, and the counting value of the PC 156 is at the maximum value.

Figure 14C:
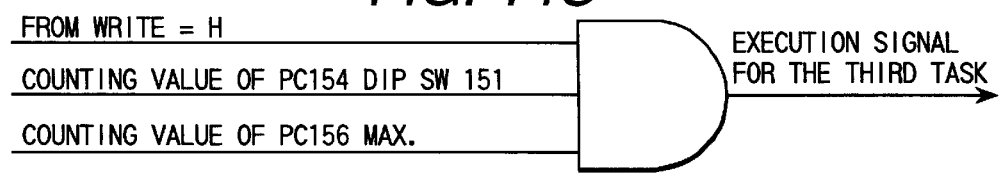

As shown in FIG. 14C, the execution signal for the third task is generated when the external signal PROM_WRITE is at the high level, the counting value of the PC 154 is larger than the set value of the dip switch 151, and the counting value of the PC 156 is not at the maximum value.

Figure 14D:
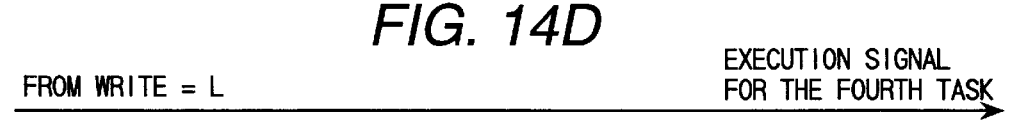

As shown in FIG. 14D, the execution signal for the forth task is generated when the external signal PROM_WRITE is at the low level.

Figure 15:
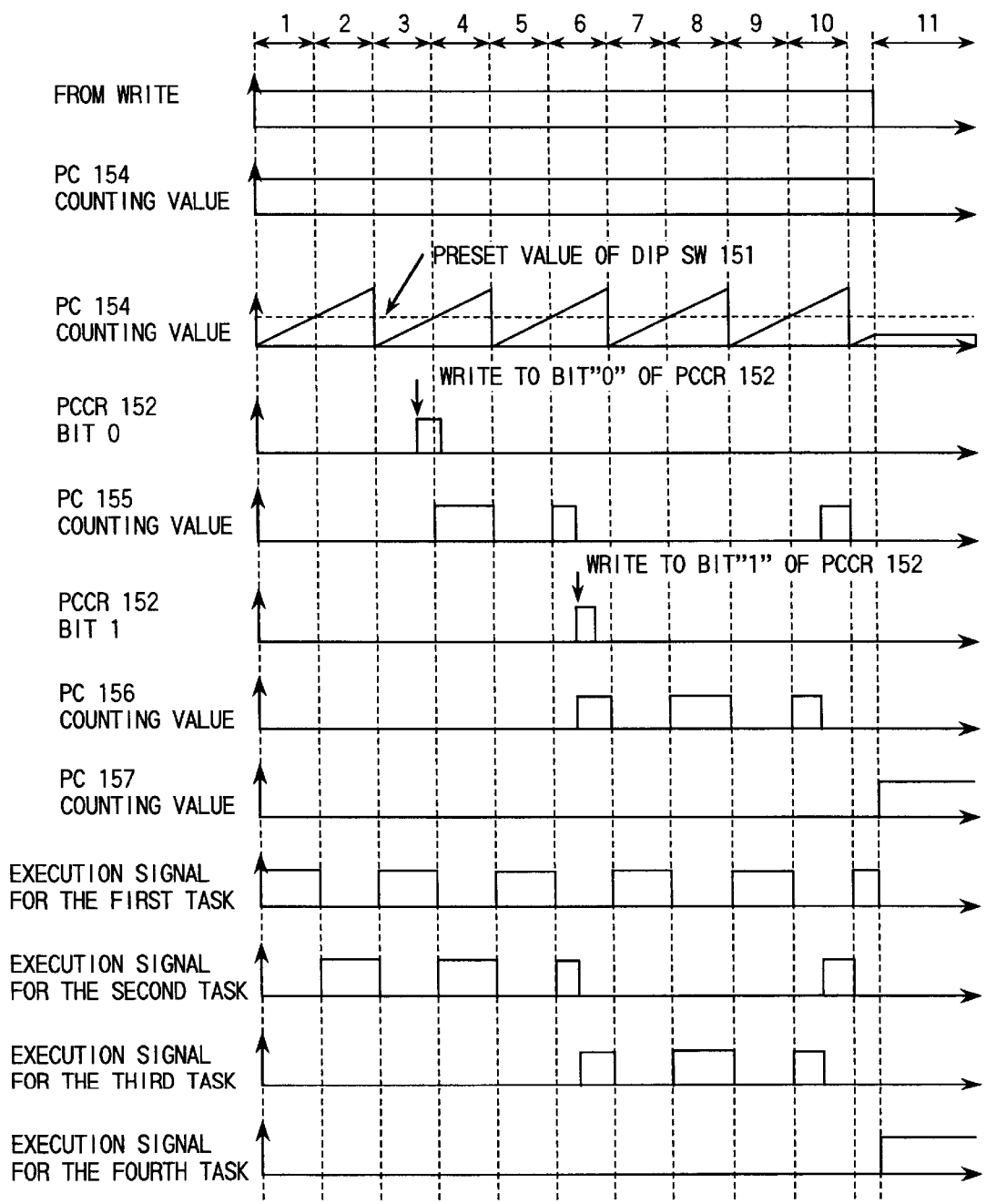
FIG. 15 is a timing chart showing the state of an internal signal in the operational unit according to the embodiment of the invention.

How the four kinds of tasks are executed by the above operation of the control unit 153 will be described by a timing chart of FIG. 15.

At timing 1, the external signal PROM_WRITE is at the high level and the counting value of the PC 154 is equal to or lower than the preset value of the dip switch 151, so that only the PC 154 is counted and the first task is executed. Since the preset value of the dip switch 151 is set at the end address of the first task program, the first task program starts at the timing 1 and is executed until the end.

At timing 2, the external signal PROM_WRITE is at the high level and the counting value of the PC 154 becomes larger than the preset value of the dip switch 151, so that the execution signal for the second task becomes true. At this moment, however, the bit 0 of the PCCR 152 is "0" and counting of the PC 155 is stopped. The second task is therefore not yet executed.

At timing 3, the external signal PROM_WRITE is at the high level and the PC 154 is overflowed and its counting value is returned to 0 and is smaller than the preset value of the dip switch 151. Only the PC 154 is therefore counted and the first task is executed.

At timing 4, similar to timing 2, the execution signal for the second task becomes true. Since "1" is written to the bit 0 of the PCCR 152 by the first program at timing 3, the PC 155 is started to be counted and the second task is executed.

At timing 5, the first task is executed and the second task is stopped in the middle. The second task is again executed at timing 6.

At timing 6, as shown in the diagram, the second task is executed in the beginning. Since "1" is written to the bit 1 of the PCCR 152 by the second task, execution of the third task is started and is continued through timing 6 and until the start point of timing 7. The third task is stopped at the start point of timing 7.

At timing 7, similar to timing 1, the first task operates.

At timing 8, the third task is executed again and is stopped again in the middle at the end of timing 8.

At timing 9, the first task is executed again.

At timing 10, the third task is executed again. Upon the end of the third task, the continuation of the second task is executed.

At timing 11, the external signal PROM_WRITE becomes at the low level, so that the fourth task operates.

As shown in the diagram, therefore, the first task is executed in a constant cycle according to the counting of the PC 154 when the external signal PROM_WRITE is at the high level.

The second and third tasks are executed in the idle time of the first task. The start of the second task is controlled by the first task and the start of the third task is controlled by the second task.

The fourth task is controlled by the external signal PROM_WRITE.

The operation of the program storing ROM address generator 158 will be described. The program storing ROM address generator 158 has the function of generating an address signal of a program storing ROM 159.

Figure 16:
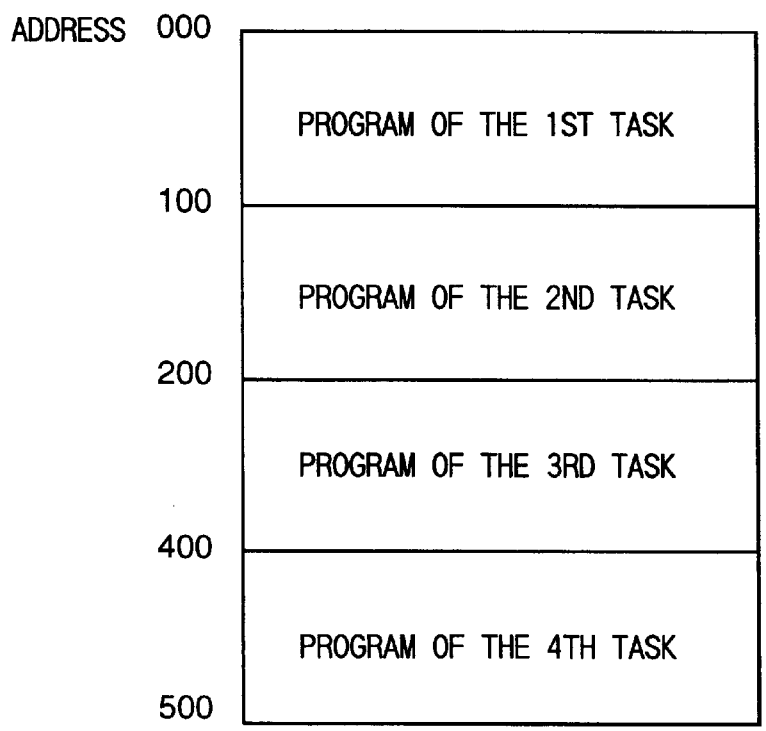
FIG. 16 is an explanatory diagram showing an address map of a program storing ROM in the embodiment of the invention.

FIG. 16 is an address map of the program storing ROM 159. As shown in the diagram, the program of the first task is stored in addresses 000 to 0FF. Similarly, the program of the second task is stored in addresses from 100 to 1FF, the program of the third task is stored in addresses from 200 to 3FF, and the program of the fourth task is stored in addresses from 400 to 4FF.

The program storing ROM address generator 158 generates address signals of the program storing ROM 159 from the execution signals for the tasks generated from the control unit 153 and the counting values of the PCs 154, 155, 156, and 157 as will be described hereinbelow.

When the execution signal for the first task is true, the upper three bits of the address signal of the program storing ROM 159 are set to "000". With respect to the lower 8 bits of the address signal of the program storing ROM 159, the counting value of the PC 157 is used as the address signal.

When the execution signal for the second task is true, the upper three bits of the address signal of the program storing ROM 159 are set to "000" and the counting value of the PC 155 is used as the lower 8 bits of the address signal of the program storing ROM 159.

When the execution signal for the third task is true, the upper two bits of the address signal of the program storing ROM 159 are set to "01" and the counting value of the PC 142 is used as the lower 9 bits of the address signal of the program storing ROM 159.

When the execution signal for the fourth task is true, the upper three bits of the address signal of the program storing ROM 159 are set to "101" and the counting value of the PC 157 is used as the lower 8 bits of the address signal of the program storing ROM 159. As mentioned above, the address signal of the program storing ROM 159 is generated from each of the counting values of the PCs 154, 155, 156, and 157 and the execution signal for the task.

The operation of the program storing ROM 159 will be explained.

Figure 17:
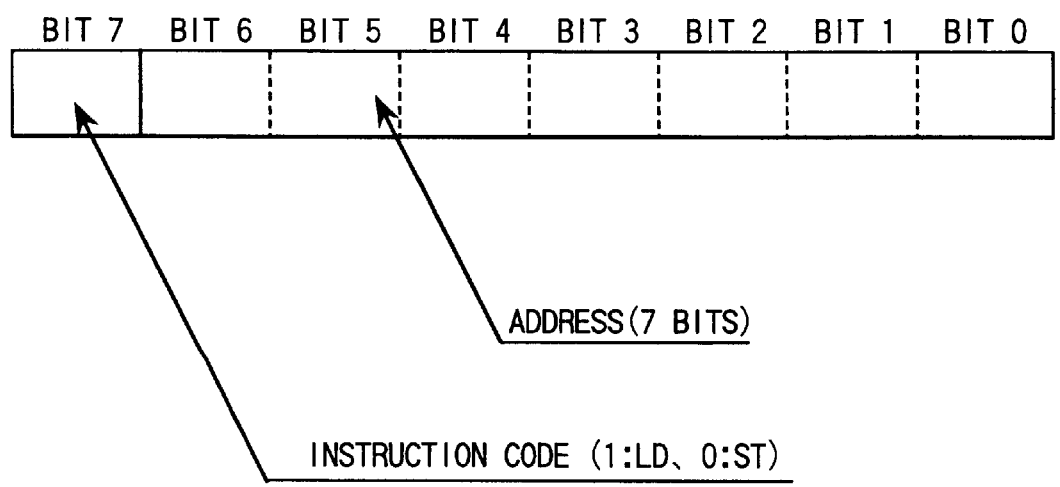
FIG. 17 is an explanatory diagram showing the contents of bits in the program storing ROM in the embodiment of the invention.

In the bit structure of the program storing ROM 159, as shown in FIG. 17, the 7th bit is for an instruction code and the 6th to 0th bits have the bit structure expressing the execution address. One word is used for one instruction.

When the instruction code is "1", an operation for transferring data from a device designated by the execution address to an accumulator 160 is executed.

When the instruction code is "0", an operation for transferring data from the accumulator 160 to a device designated by the execution address is carried out.

Consequently, the control signal of the internal bus and the signal of the address bus can be generated as follows.

As the signal of the address bus, data from bit 6 to bit 0 in the program storing ROM 159 is outputted as it is.

As the control signal (read and write signals), the data of bit 7 in the program storing ROM 159 is outputted as it is.

According to the embodiment, therefore, the control signal of the internal bus and the signal of the address bus can be generated only by the above operation.

The operational unit 161 will now be described. The operational unit 161 has the logic structure shown in FIG. 18 and supports the processes of addition, AND operation, inversion, arithmetic right shift, and arithmetic left shift.

Figure 18:
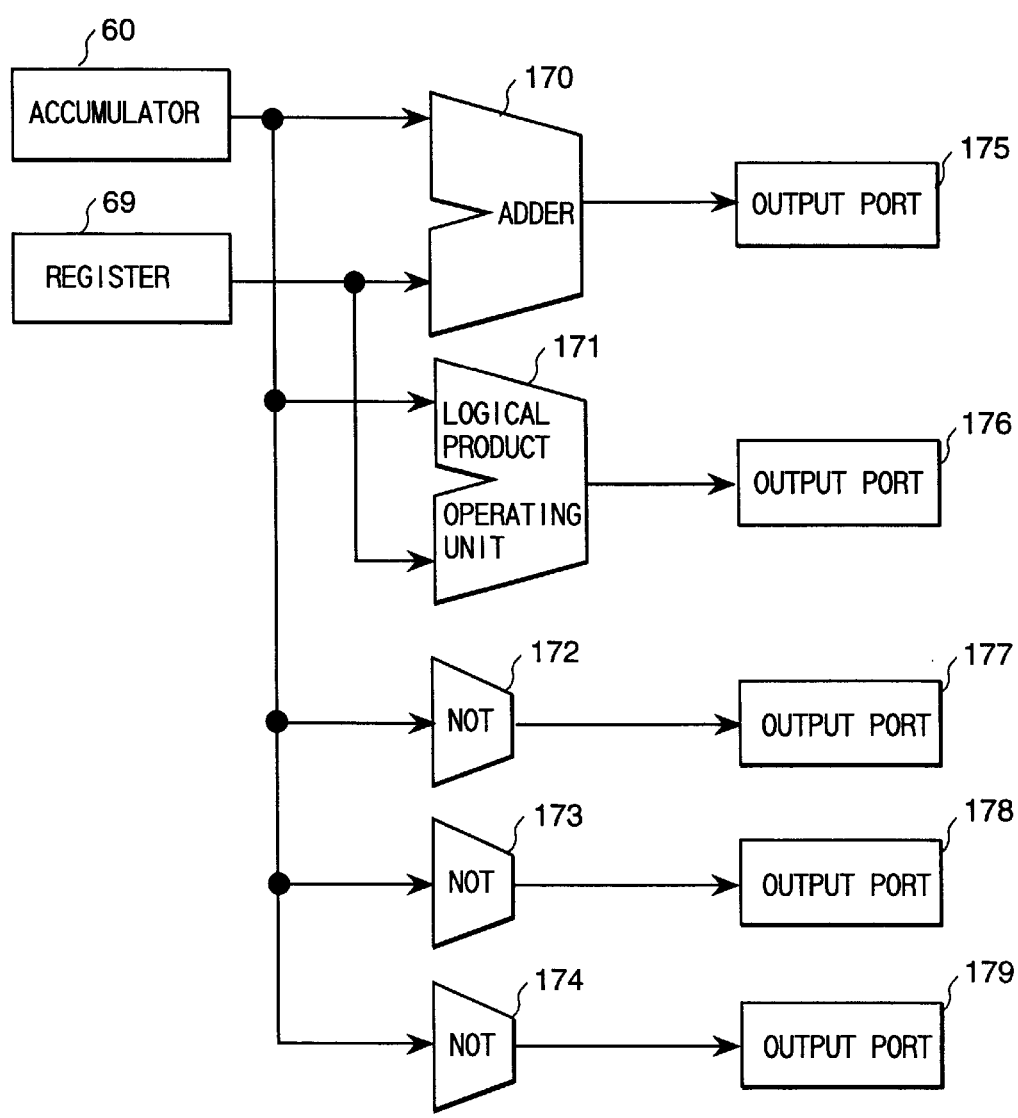
FIG. 18 is a diagram showing the construction of the operational unit in the embodiment of the invention.

The adding operation is executed as shown in FIG. 18 in such a manner that the contents of a register 169 which is connected to the internal bus and has a predetermined address, and to/from which data can be inputted/read are added to the contents of the accumulator 160 by an adder 170 and the result of the addition is supplied to an output port 175 which is connected to the internal bus and has a predetermined address.

For the adding operation, therefore, it is sufficient to transfer addition data to the register 169, transfer the data to be added to the accumulator 160, and read the output port 175. The addition result can be obtained only by the operation.

The adder 170 deals the data with complement on two. When an overflow or underflow occurs, the maximum positive number or the maximum negative number is set. Consequently, overflow and underflow processes are made unnecessary in the program.

According to the embodiment, therefore, although versatility for the data length is reduced, the number of steps of the program can be reduced and the execution time can be shortened for an application in which the data length is fixed.

The AND operation will be described.

In case of AND operation, similar to the adding operation, the contents of the accumulator 160 and the contents of the register 169 are supplied to an AND operational unit 171 and the result of the AND operation is outputted to an output port 176.

For the AND operation, it is sufficient to transfer the AND data to the register 169, transfer data to be subjected to the AND operation to the accumulator 160, and read the output port 176. The AND result can be obtained by the operation.

In the inverting operation, the contents of the accumulator 160 are supplied to an inversion operational unit 172 and the result of the inverting operation is outputted to an output port 177. For the inverting operation, therefore, it is sufficient to transfer data to be inversion operated to the accumulator 160 and read the output port 177. The result of the inverting operation can be easily obtained.

In the arithmetic right shift operation, the contents of the accumulator 160 are inputted to an arithmetic right shift operational unit 173 and the result of the arithmetic right shift operation is outputted to an output port 178. For the arithmetic right shift operation, it is therefore sufficient to transfer data to be subjected to the arithmetic right shift operation to the accumulator 160 and read the output port 178. The result of the arithmetic right shift operation can be obtained only by the operation.

In the arithmetic left shift operation, the contents of the accumulator 160 are inputted to an arithmetic left shift operational unit 174 and the result of the arithmetic left shift operation is outputted to an output port 179. For the arithmetic left shift operation, it is therefore sufficient to transfer data to be subjected to the arithmetic left shift operation to the accumulator 160 and read the output port 179. The result of the arithmetic left shift operation can be easily obtained by the operation.

The operation of a register 169 will now be described.

When the contents of the register 169 are in a predetermined state or the state of the task execution signal is in a predetermined state, the register 169 is controlled to be write inhibited on the basis of the existence or absence of occurrence of a carry in the operational unit 161. With the structure, a branching process necessary for the arithmetic operation can be falsely realized.

The condition of the write inhibition is not limited by the existence or absence of the carry. Similarly, writing can be inhibited by occurrence of an overflow, writing of predetermined data to a predetermined register, and the like. Consequently, the operation of a program counter accompanying the branching operation is made unnecessary and the logic scale of the program counter can be reduced.

The characteristics of the operational unit 4 in the embodiment will be described. The first characteristic is that a resetting operation is unnecessary.

In a case of a conventional technique using a regular MPU (microprocessing unit), the resetting operation is always required by the following reasons.

In the conventional technique, the program storing ROM is connected to the same bus to which a data storing ROM, a RAM, an I/O are connected. Consequently, if the resetting operation is not performed, the initial value of the program counter becomes unstable. There is the possibility that the initial value of the program counter indicates the data storing ROM, RAM, or I/O.

As for the instruction word lengths, there are instructions of one, two, and three words. The length is different according to an instruction code and an addressing mode. Consequently, even if the initial value of the program counter indicates the program storing ROM by chance, it does not always indicate the address including the instruction code.

Since the backward branch instruction is generally supported, even if the initial value of the program counter indicates the instruction code of the program storing ROM by chance, there is the possibility to enter an endless loop.

Further, in the conventional MPU, the number of instruction codes is large and the number of addressing modes is large. Consequently, an instruction decoder itself for analyzing an instruction needs the resetting operation.

An application program is generally made on the premise of the initial process, so that the initial value of the program counter has to be set to a predetermined value. Consequently, the reset is indispensable.

Due to the resetting function, however, a general MPU always has the danger of runaway. For an application which requires strict reliability, therefore, a watch dog timer or the like is provided as a countermeasure for the runaway. The cost of the countermeasure for the runaway is too high to ignore and increase in cost is unavoidable.

The invention realizes the operational unit which does not require the resetting operation. Since the resetting operation can be made unnecessary, the danger of runaway is eliminated. The countermeasure for runaway such as a watch dog timer is unnecessary and the operational unit can be applied to a cheap product.

The reason why the resetting operation is unnecessary in the operational unit 4 according to the embodiment of the invention will be described hereinbelow.

The program storing ROM is connected to a data bus which is different from the bus to which the data storing ROM, RAM, I/O and the like are connected.

As a result, the possibility that the initial value of the program counter indicates the data storing ROM, RAM, and I/O can be eliminated.

The length of instruction word is fixed to one word, so that the initial value of the program counter always indicates the address including the instruction code.

The backward branch instruction can be also eliminated.

Generally, since it is necessary to form a loop in an application program, the backward branch is always necessary.

Since a repeating control is executed in the operational unit 4 in the embodiment of the invention as well, a loop is necessary. By using the fact that the counting value of the counter is returned to "0" when each of the program counters 154, 155, 156, and 157 is overflowed, a loop for the repeating control is obtained.

In the operational unit 4, two kinds of instruction codes of a load (data transfer to the accumulator) and a store (data transfer from the accumulator) are used, only direct addressing is employed as the addressing mode, and only one accumulator is used.

With the structure, the instruction decoder itself is made unnecessary and the logic can be simplified, thereby realizing a logic structure which does not require the resetting operation.

According to the embodiment, the application program is limited to adjustment of the zero point and the span of the sensor, calculation for the filtering process, and the like and does not require initialization.

No problem occurs if the application program can be executed from any part with respect to the adjustment of the zero point and the span of the sensor.

The second characteristic is that two kinds of instruction codes of loading (data transfer to the accumulator) and storing (data transfer from the accumulator) are used and the instruction decoder is not employed. Consequently, reduction in the logic scale can be realized and the above-mentioned resetting operation can be made unnecessary.

Specifically, the above is achieved by adopting the operational unit 161 as shown in FIG. 12.

That is, by using the operational unit 161, even if there are two kinds of the instruction codes of loading and storing, the arithmetic operations such as addition, AND operation, inversion, arithmetic right shift and arithmetic left shift can be realized.

Specifically, the branch process is falsely realized by adopting the register 169 as shown in FIG. 18, so that the inherent branch process is unnecessary. Consequently, only two kinds of the instruction codes of loading and storing of the operational unit 4 are sufficient.

The third characteristic is that four kinds of tasks are operated time divisionally with a simple circuit construction in the operational unit 4 according to the embodiment of the invention. The four program counters (PCs) 154, 155, 156, and 157 are provided and the four kinds of tasks are executed by the four PCs, thereby enabling complicated processes to be executed with a simple circuit construction.

The first task can be regarded as a timer interrupting process. The third task can be regarded as a subroutine process. The fourth task can be regarded as an interrupting process by an external signal. Therefore, the complicated operation can be carried out with the simple circuit construction.

The operation as a decimator of the operational unit 4 of the embodiment will be described with reference to FIG. 19.

Figure 19:
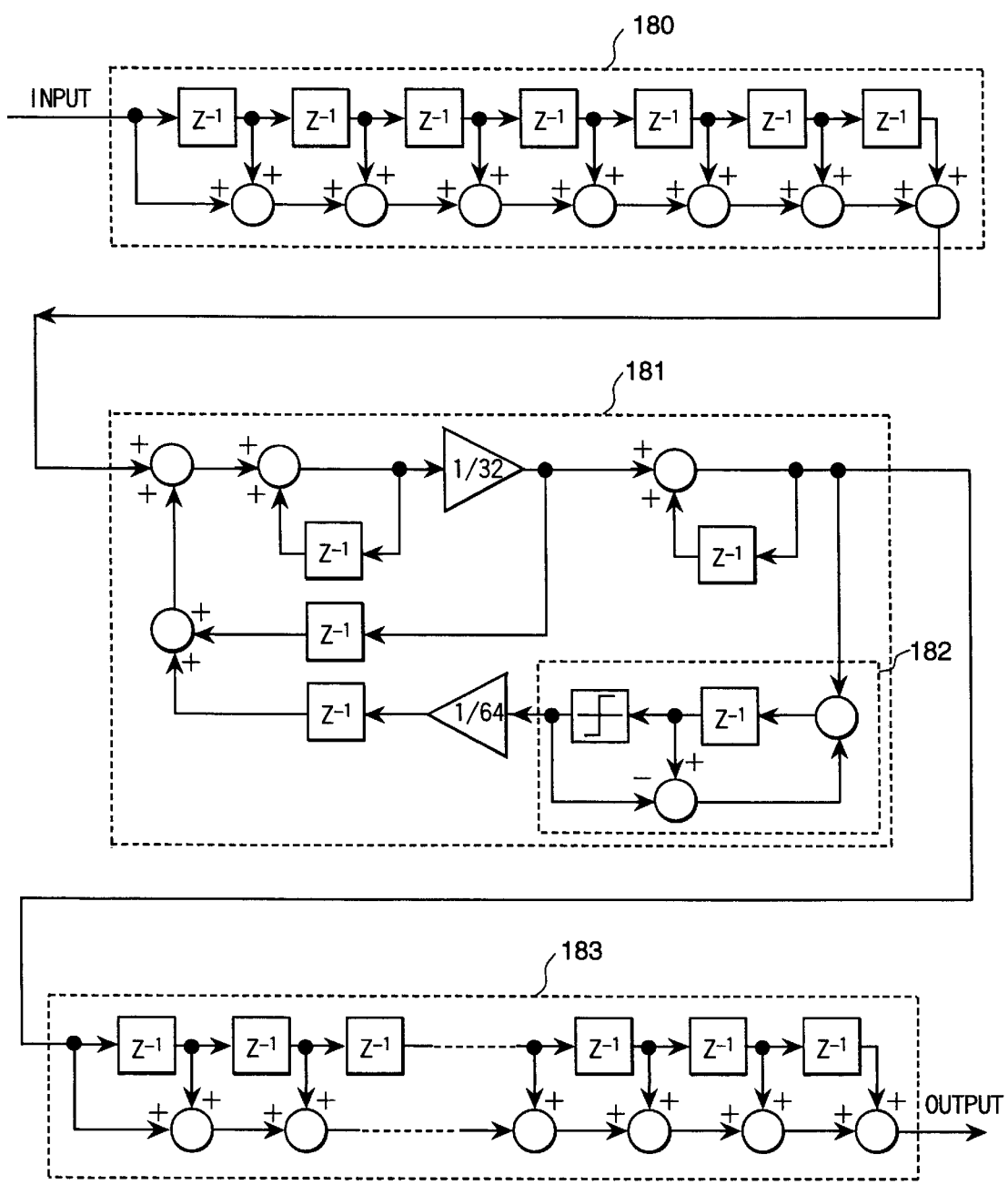
FIG. 19 is a block diagram showing the function of a decimator in the embodiment of the invention.

FIG. 19 is a block diagram showing the function of the decimator. The decimator in the embodiment comprises an FIR filter 180, an IIR filter 181, and an FIF filter 183 each having unit delay circuits $Z^{-1}$.

The FIR filter 180 is a part having the function of generating 1-bit signals of levels 1 and 0 outputted from the comparator 2 (FIG. 3) in a predetermined cycle every 8 cycles and supplying the signals to the IIR filter 181. Specifically, the above operation is realized by the counter 162 (FIG. 12) which is reset every 8 cycles and is counted up when the output of the comparator 2 is "1".

The IIR filter 181 and the FIR filter 183 are realized by the first task of the application program of the operational unit 4. The IIR filter 181 is provided with a significant digit cancellation compensating circuit 182 for compensating cancellation of significant digits.

The decimator is usually constructed by an FIR filter. The construction is, however, realized only by an extremely large-scaled logic circuit since the characteristic deteriorates due to the cancellation of significant digits.

According to the invention, however, by additionally providing the significant digit cancellation compensating circuit 182, the deterioration of the characteristic occurred by the cancellation of significant digits can be reduced. Thus, as shown in the diagram, the decimator is easily realized by a simple logic circuit.

Figure 20:
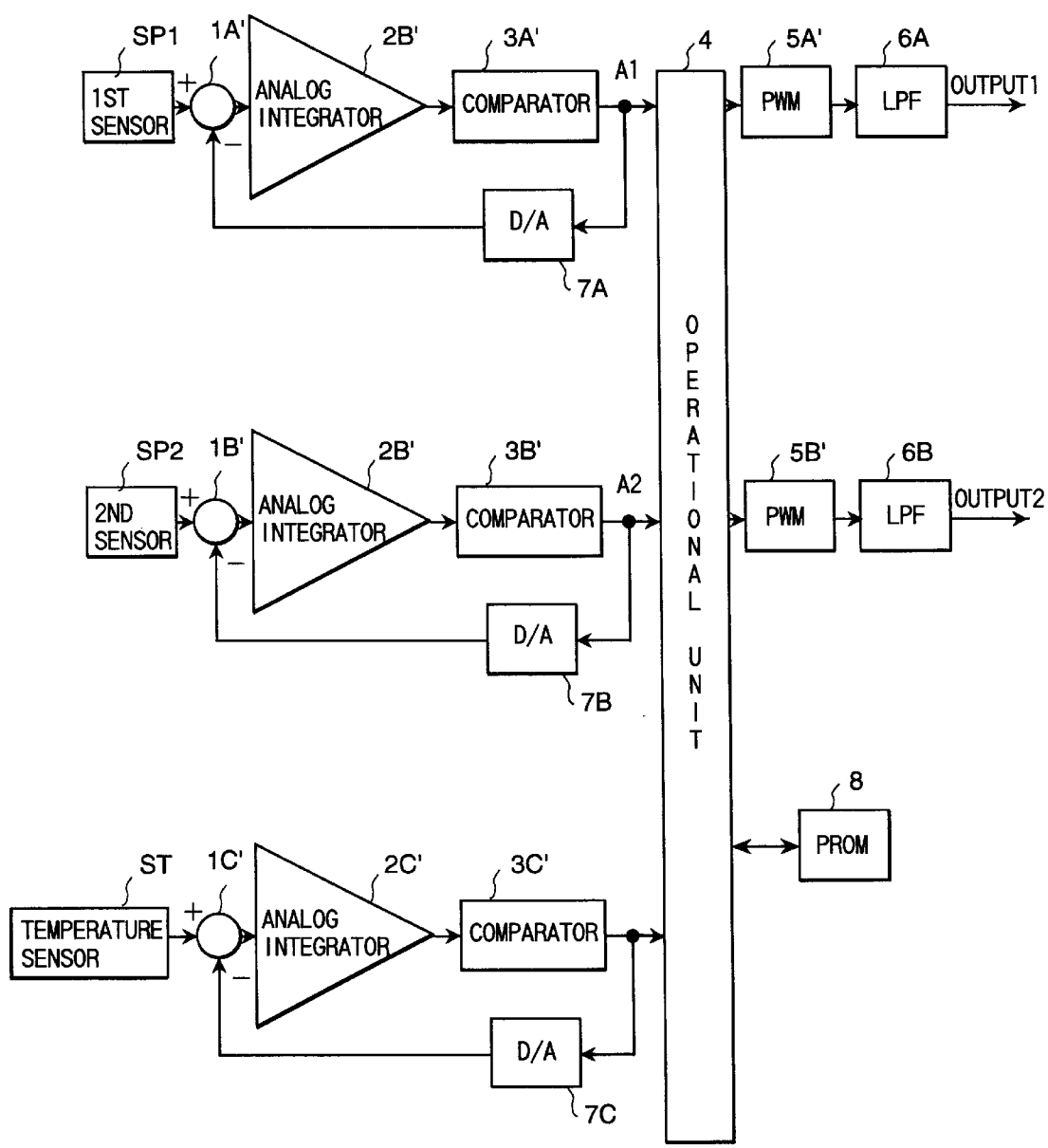
FIG. 20 is a block diagram of a sensor adjusting circuit according to another embodiment of the invention.

Another embodiment of the sensor adjusting circuit of the invention will be described with reference to FIG. 20.

Although the signal process of the single sensor S is executed by the operational unit 4 in a one-to-one corresponding manner in the embodiment of FIG. 9, the signal process for a plurality of sensors can be also carried out by a single operational unit 4 depending on its processing ability. In the embodiment as shown in FIG. 20, a first pressure sensor SP1, a second pressure sensor SP2, and a temperature sensor ST are controlled by a signal operational unit 4.

An output of the first pressure sensor SP1 is modulated by a part comprising a subtracter 1A, an analog integrator 1A, a comparator 2A, and a 1-bit D/A converter 7A and is supplied as a signal A1 to the operational unit 4.

Similarly, an output of the second pressure sensor SP2 is modulated by a part comprising a subtracter 1B, an analog integrator 1B, a comparator 2B, and a 1-bit D/A converter 7C and is supplied as a signal A2 to the operational unit 4.

An output of the temperature sensor ST is modulated by a part comprising a subtracter 1C, an analog integrator 1C, a comparator 2C, and a 1-bit D/A converter 7C and is supplied as a signal T to the operational unit 4.

The operational unit 4 sequentially receives the signals A1, A2, and T time divisionally and executes the following arithmetic operations.

For the output of the first pressure sensor SP1, correction data for the first pressure sensor SP1 is read from the PROM 8, the span and the zero point are nonlinearly adjusted, a process for correcting the temperature by the output of the temperature sensor ST is executed, the processed signal is outputted to the PWM 5A, and an output 1 is obtained from the LPF 6A. For the output of the second pressure sensor SP2, similarly, correction data for the second pressure sensor SP2 is read out from the PROM 8, the span and the zero point are nonlinearly adjusted, a process for correcting the temperature by the output of the temperature sensor ST is executed, the processed signal is outputted to the PWM 5B and an output 2 is obtained from the LPF 6B.

Consequently, according to the embodiment of FIG. 13 as well, the same effects as those in the foregoing embodiment can be obtained. Even when the number of sensors is large, the characteristics of the digital system can be sufficiently utilized by hardly enlarging the hardware scale and the characteristics of the sensor can be adjusted with high accuracy.

According to the embodiment of the invention as mentioned above, the first stage amplification function and the A/D converting function are obtained by performing the $\Delta\Sigma$ modulation to the output of the sensor and the D/A converting function is obtained by the PWM and the filter operation. Consequently, the functional overhang is suppressed and the circuit-scale can be reduced. Thus, the digital signal processor having a very accurate characteristic which can be easily formed on a chip can be provided at low cost.

What is claimed is:

1. A sensor adjusting circuit for adjusting an analog input signal inputted from a sensor in accordance with a physical quantity to be sensed and outputting the analog input signal as another analog output signal, comprising:

a first analog-to-digital converter having an analog integrator for integrating said analog input signal, a comparator for comparing an output of said analog integrator with a predetermined value, and a D/A converter for outputting an output of said comparator as said input signal; and a second digital-to-analog converter for D/A converting the output of said comparator and outputting resultant data as said analog output signal.

2. A circuit according to claim 1, further comprising an operational unit for digitally processing the output of said comparator and outputting resultant data to said second digital-to-analog converter.

3. A sensor adjusting circuit comprising an analog-to-digital converter, an operational unit for processing an output of said analog-to-digital converter by a prestored program, and a writable memory for holding data for adjustment, wherein said analog-to-digital converter is constructed by an oversampling analog-to-digital converter including an analog integrator, a comparator, and a digital-to-analog converter, and said oversampling analog-to-digital converter is constructed to generate an output having the number of bits which is equal to or lower than an accuracy required by a sensor as an object in a cycle which is equal to or faster than 1/10 of a response cycle required by said sensor.

4. A sensor adjusting circuit comprising an analog-to-digital converter, an operational unit for processing an output of said analog-to-digital converter by a prestored program, and a writable memory for holding data for adjustment, wherein said analog-to-digital converter is constructed by an oversampling analog-to-digital converter including an analog integrator, a comparator, and a digital-to-analog converter, and said oversampling analog-to-digital converter has conversion accuracy of 4 or 8 bits.

5. A sensor adjusting circuit comprising an analog-to-digital converter, an operational unit for processing an output of said analog-to-digital converter by a prestored program, and a writable memory for holding data for adjustment, wherein said analog-to-digital converter is constructed by an oversampling analog-to-digital converter including an analog integrator, a comparator, and a digital-to-analog converter, and said oversampling analog-to-digital converter constructs a part of a sensor circuit of a sensor as an object.

6. A sensor adjusting circuit comprising an analog-to-digital converter, an operational unit for processing an output of said analog-to-digital converter by a prestored program, and a writable memory for holding data for adjustment, wherein said analog-to-digital converter is constructed by an oversampling analog-to-digital converter including an analog integrator, a comparator, and a digital-to-analog converter, said oversampling analog-to-digital converter generates an output having the number of bits which is equal to or less than an accuracy required by a sensor as an object in a cycle which is equal to or faster than 1/10 of a response cycle required by said sensor, and an average value of outputs of said operational unit satisfies the requirement of said sensor.

7. A circuit according to any one of claims 3 to 6, wherein said operational unit is operated by a cyclic program which cycles from address 0 to address of the maximum counting value of a program counter so that a reset upon turn-on of a power source is unnecessary.

8. A circuit according to any one of claims 3 to 6, wherein said writable memory which holds data for adjustment has an error correction logic and an error detection logic.

9. A digital sensor adjusting circuit for adjusting an output of a sensor for sensing a physical quantity by processing the output of the sensor with prestored data for characteristic adjustment, comprising:

an analog integrator for integrating and outputting an output of said sensor;

a comparator for converting outputs of said analog integrator into digital signals of level 1 and 0;

a 1-bit D/A converter for converting an output of said comparator into an analog signal and outputting the analog signal; and a subtracter for subtracting an output of said 1-bit D/A converter from an input of said analog integrator, wherein the output of said comparator is processed with said prestored data for characteristic adjustment, thereby adjusting an output of said sensor.

10. A circuit according to claim 4, wherein said operational unit is operated by a cyclic program which cycles from address 0 to address of the maximum counting value of a program counter so that a reset upon turn-on of a power source is unnecessary.

11. A circuit according to claim 5, wherein said operational unit is operated by a cyclic program which cycles from address 0 to address of the maximum counting value of a program counter so that a reset upon turn-on of a power source is unnecessary.

12. A circuit according to claim 6, wherein said operational unit is operated by a cyclic program which cycles from address 0 to address of the maximum counting value of a program counter so that a reset upon turn-on of a power source is unnecessary.

13. A circuit according to claim 4, wherein said writeable memory which holds data for adjustment has an error correction logic and an error detection logic.

14. A circuit according to claim 5, wherein said writeable memory which holds data for adjustment has an error correction logic and an error detection logic.

15. A circuit according to claim 6, wherein said writeable memory which holds data for adjustment has an error correction logic and an error detection logic.

* * * * *